US012698088B1

(12) United States Patent
Maharjan et al.

(10) Patent No.: US 12,698,088 B1
(45) Date of Patent: Aug. 4, 2026

(54) FAULT DETECTION SYSTEMS AND METHODS FOR ELECTRIC DRIVES USING REDUNDANT SPEED AND POSITION DATA

(71) Applicant: Amazon Technologies, Inc., Seattle, WA (US)

(72) Inventors: Lizon Maharjan, Seattle, WA (US); Xiaoqi Wang, Bellevue, WA (US); Tausif Husain, Maple Valley, WA (US); Sheverria Antony Aikens, Mill Creek, WA (US); Frederic Pierre Lacaux, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 18/621,657

(22) Filed: Mar. 29, 2024

(51) Int. Cl.
| | |
|---|---|
| B64D 31/09 | (2024.01) |
| B64F 5/60 | (2017.01) |
| G01P 3/48 | (2006.01) |

(52) U.S. Cl.
CPC ............... B64D 31/09 (2024.01); B64F 5/60 (2017.01); G01P 3/48 (2013.01)

(58) Field of Classification Search
CPC ............... B64D 31/09; B64F 5/60; G01P 3/48
See application file for complete search history.

(56) References Cited

U.S. PATENT DOCUMENTS

| | | | | |
|---|---|---|---|---|
| 6,085,127 | A * | 7/2000 | Vos ..................... | G05D 1/0077 701/4 |
| 7,002,318 | B1 * | 2/2006 | Schulz ................. | B60L 3/0038 318/490 |
| 10,366,549 | B1 * | 7/2019 | Mash ................... | G07C 5/0808 |
| 10,710,719 | B1 * | 7/2020 | Lott, III ............... | G01S 1/0423 |
| 10,745,115 | B2 * | 8/2020 | Kimchi ................. | B64C 27/52 |
| 11,866,195 | B2 * | 1/2024 | Yuksel ............... | G05B 23/0243 |
| 2018/0072404 | A1 * | 3/2018 | Prager ..................... | B64D 1/22 |
| 2018/0072414 | A1 * | 3/2018 | Cantrell ................ | B64U 10/13 |
| 2018/0300191 | A1 * | 10/2018 | Bengea ............... | G06F 11/0703 |
| 2019/0179345 | A1 * | 6/2019 | McEwan ............... | G05D 1/101 |
| 2019/0283865 | A1 * | 9/2019 | Mueller .............. | G05D 1/0072 |
| 2020/0312168 | A1 * | 10/2020 | Liu ...................... | G05D 1/0676 |
| 2021/0354855 | A1 * | 11/2021 | Kim ......................... | G07C 3/04 |
| 2022/0399936 | A1 * | 12/2022 | Arksey .................... | G06T 7/73 |

* cited by examiner

*Primary Examiner* — Mussa A Shaawat
(74) *Attorney, Agent, or Firm* — Athorus, PLLC

(57) ABSTRACT

Fault detection systems and methods may include error determinations related to position sensors and/or sensorless estimators that are associated with respective motors or electric drives of an aerial vehicle. Based on various detected faults, operations of affected motors may be modified, such as stopping operation or modifying motor control processes, in order to maintain safe flight and navigation of the aerial vehicle.

20 Claims, 10 Drawing Sheets

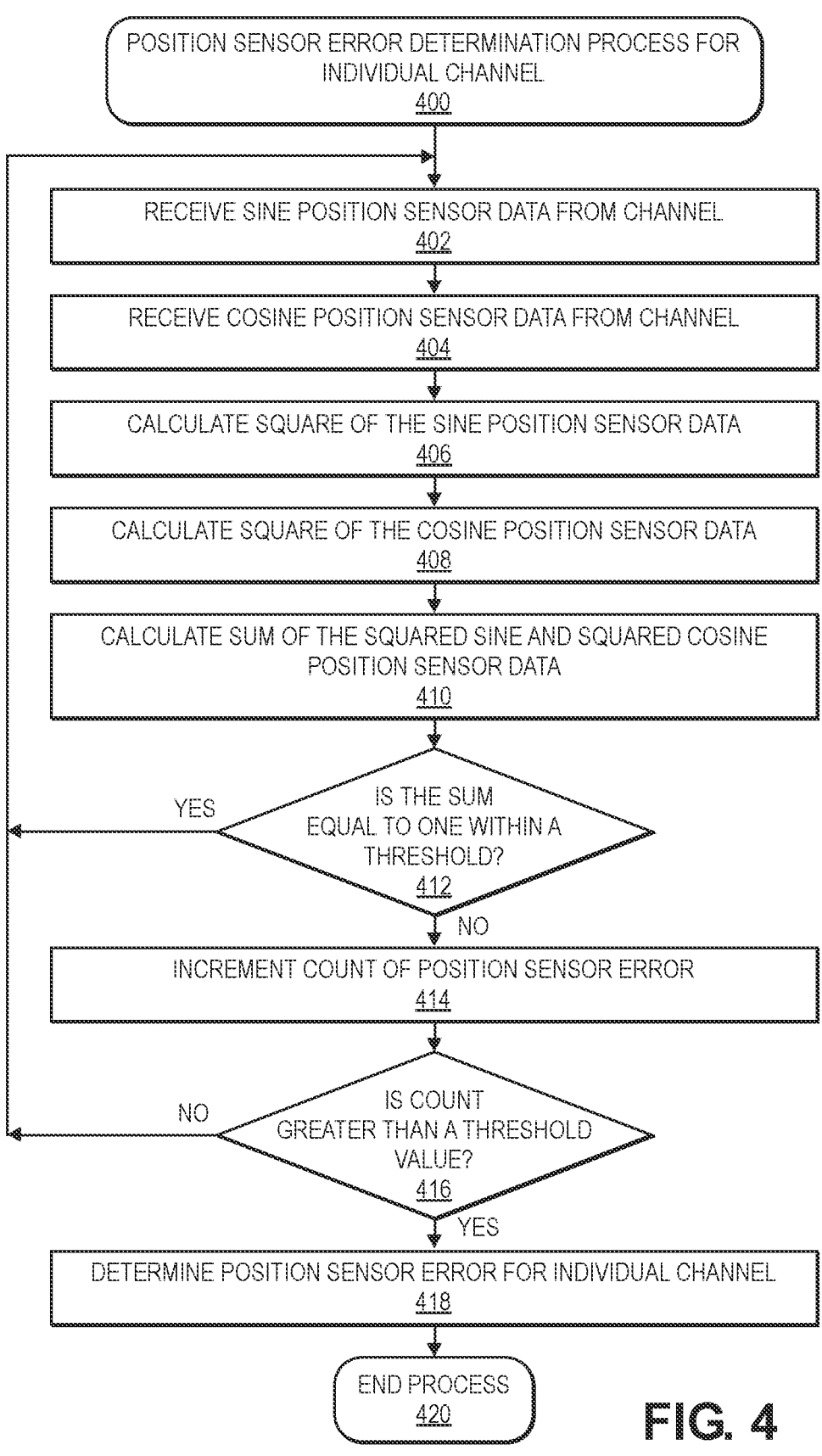

POSITION SENSOR ERROR DETERMINATION PROCESS FOR INDIVIDUAL CHANNEL
400

RECEIVE SINE POSITION SENSOR DATA FROM CHANNEL
402

RECEIVE COSINE POSITION SENSOR DATA FROM CHANNEL
404

CALCULATE SQUARE OF THE SINE POSITION SENSOR DATA
406

CALCULATE SQUARE OF THE COSINE POSITION SENSOR DATA
408

CALCULATE SUM OF THE SQUARED SINE AND SQUARED COSINE POSITION SENSOR DATA
410

IS THE SUM EQUAL TO ONE WITHIN A THRESHOLD?
412

YES

NO

INCREMENT COUNT OF POSITION SENSOR ERROR
414

IS COUNT GREATER THAN A THRESHOLD VALUE?
416

NO

YES

DETERMINE POSITION SENSOR ERROR FOR INDIVIDUAL CHANNEL
418

END PROCESS
420

FIG. 4

FAULT DETECTION SYSTEMS AND METHODS FOR ELECTRIC DRIVES USING REDUNDANT SPEED AND POSITION DATA

BACKGROUND

Uncrewed aerial vehicles ("UAV") are continuing to increase in use. For example, UAVs are often used by hobbyists to obtain aerial images of buildings, landscapes, etc. While there are many beneficial uses of these vehicles, propulsion mechanisms of such vehicles need to be reliably, precisely, and accurately controlled based on data associated with such propulsion mechanisms. Accordingly, there is a need for systems and methods to provide reliable, precise, and accurate detection of various faults or failure modes associated with control of propulsion mechanisms based on position sensor data and/or using sensorless estimation methods.

BRIEF DESCRIPTION OF THE DRAWINGS

FIG. 4 is a flow diagram illustrating an example position sensor error determination process for an individual channel, in accordance with implementations of the present disclosure.

DETAILED DESCRIPTION

Figure 1:
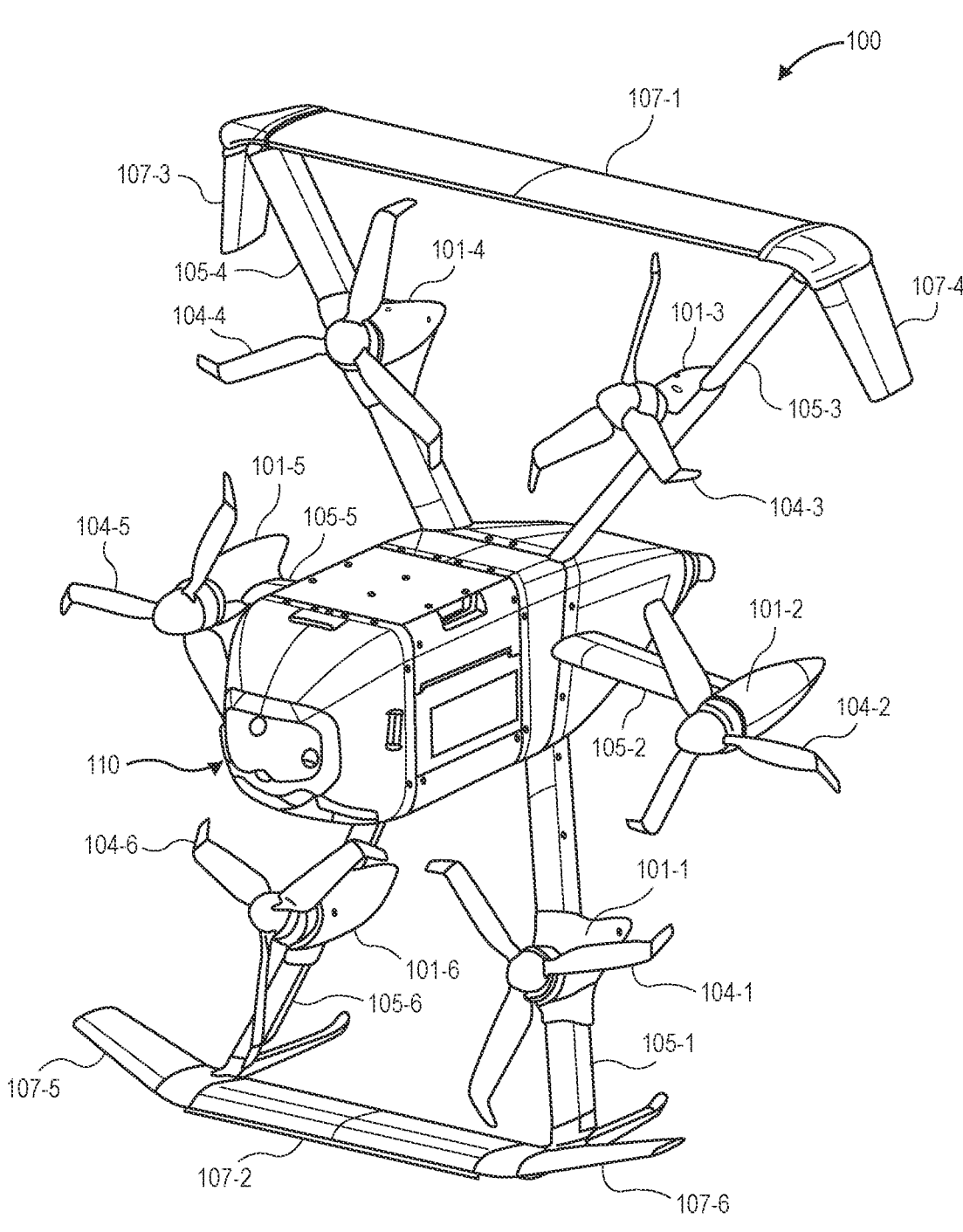
FIG. 1 is a perspective view of an example aerial vehicle, in accordance with implementations of the present disclosure.

As is set forth in greater detail below, implementations of the present disclosure are directed to fault detection systems and methods for electric drives of uncrewed aerial vehicles, in which faults or failure modes may be determined based on position sensor data, sensorless estimator data, and/or a combination of both.

Generally, motor controllers of aerial vehicles may control motors or electric drives based on desired speeds and/or positions of respective motors. Motor controllers may comprise or form a part of power electronics that are used by aerial vehicles to control motors or electric drives. In some examples, the power electronics or motor controllers may also comprise motor drives, electronic speed controllers, inverters, variable speed drives, or other electronic components configured to control motors or electric drives.

In some example embodiments of aerial vehicles and electric drives, position sensors, such as encoders, resolvers, or similar sensors, may detect or measure speed and position data of respective motors or electric drives. The motor controllers may then control the motors or electric drives based on the speed and position data detected by the position sensors. In additional example embodiments of aerial vehicles and electric drives, sensorless estimators, which may implement various types of sensorless motor control algorithms, may determine or estimate speed and position data of respective motors or electric drives, e.g., based on detected current signals or other electrical signals. The motor controllers may then control the motors or electric drives based on the speed and position data estimated by the sensorless estimators.

In example embodiments of aerial vehicles and electric drives having both position sensors and sensorless estimators, the fault detection systems and methods described herein may detect and determine faults associated with one or both of the position sensor data and sensorless estimator data for respective motors. Further, the fault detection systems and methods described herein may determine faults or failure modes associated with difference data between measured speed data from position sensors and estimated speed data from sensorless estimators associated with respective motors.

Responsive to determined faults or failure modes of respective motors based on position sensor data, sensorless estimator data, and/or difference data, various changes or modifications to control of motors or electric drives may be instructed or implemented in order to maintain safe and reliable operation of aerial vehicles having multiple motors or electric drives. In some examples, if one or more faults are determined based on position sensor data, sensorless estimator data, and/or difference data associated with a respective motor, the respective motor may be shut down or turned off, and remaining motors of an aerial vehicle may modify their operations to continue to safely navigate or land the aerial vehicle. In other examples, if one or more faults are determined based on position sensor data, sensorless estimator data, and/or difference data associated with a respective motor, the respective motor may be controlled using speed and position data from a source, e.g., the position sensor or the sensorless estimator, that is not experiencing a fault, and the aerial vehicle may continue its operations using all motors of the aerial vehicle.

By combining and integrating position sensor data, sensorless estimator data, and/or difference data to determine faults or failure modes of respective motors, the fault detection systems and methods described herein may ensure safe and reliable operation of uncrewed aerial vehicles having multiple motors or electric drives.

FIG. 1 is a perspective view of an example aerial vehicle 100, in accordance with implementations of the present disclosure.

The aerial vehicle 100 includes six propulsion mechanisms including motors 101-1, 101-2, 101-3, 101-4, 101-5, and 101-6 and propellers 104-1, 104-2, 104-3, 104-4, 104-5, and 104-6 spaced about a fuselage 110 of the aerial vehicle 100. While the propulsion mechanisms may include motors 101 and associated propellers 104 in the implementations described herein, in other implementations, other forms of propulsion may be utilized as the propulsion mechanisms. For example, one or more of the propulsion mechanisms of the aerial vehicle 100 may utilize electric drives, fans, jets, turbojets, turbo fans, jet engines, and/or the like to maneuver the aerial vehicle. Generally described, a propulsion mechanism, as used herein, includes any form of propulsion mechanism that is capable of generating a force sufficient to maneuver the aerial vehicle, alone and/or in combination with other propulsion mechanisms. Furthermore, in selected implementations, propulsion mechanisms may be configured such that their individual orientations may be dynamically modified (e.g., change from vertical to horizontal flight orientation or any position therebetween). In addition, the terms propeller and propeller blade are used herein substantially interchangeably with reference to the disclosed implementations, with the understanding that a propeller may comprise one or more propeller blades.

Likewise, while the examples herein describe the propulsion mechanisms being able to generate force in either direction, e.g., pulling or pushing directions, in some implementations, the propulsion mechanisms may only generate force in a single direction. However, the orientation of the propulsion mechanisms may be adjusted so that the force can be oriented in a positive direction, a negative direction, and/or any other direction.

In example embodiments described herein, one or more position sensors may be associated with respective motors or electric drives 101-1, 101-2, 101-3, 101-4, 101-5, and 101-6. The one or more position sensors may detect or measure position and speed data of respective motors, which data may be used to determine one or more faults or failures modes of respective motors. In addition, one or more sensorless motor control estimators may be associated with respective motors or electric drives 101-1, 101-2, 101-3, 101-4, 101-5, and 101-6. The one or more sensorless estimators may determine or estimate position and speed data of respective motors, which data may also be used to determine one or more faults or failures modes of respective motors. Further, data from position sensors, e.g., measured speed data, and data from sensorless estimators, e.g., estimated speed data, may be compared to determine speed difference data that may further indicate one or more faults or failures modes of respective motors. Further details of the example fault detection systems and methods are described herein at least with respect to FIGS. 2-10.

Referring again to FIG. 1, in this implementation, the aerial vehicle 100 may include a partial ring wing 107 having an approximately hexagonal shape that extends partially around a perimeter of the aerial vehicle 100. In the illustrated example, the partial ring wing may include an upper section or segment 107-1, a lower section or segment 107-2, and partial side sections or segments 107-3, 107-4, 107-5, and 107-6 that may be joined at opposing ends of the upper or lower sections 107-1, 107-2 to form the partial ring wing 107 around the aerial vehicle 100. Each segment of the partial ring wing 107 may include an airfoil shape to produce lift when the aerial vehicle is oriented as illustrated in FIG. 1 and moving in a direction that is substantially horizontal. As illustrated, and discussed further below, the partial ring wing may be positioned at an angle with respect to the fuselage 110 such that the lower segment 107-2 of the partial ring wing acts as a front wing as it is toward the front of the aerial vehicle when oriented as shown and moving in a horizontal direction. The upper segment 107-1 of the partial ring wing, which may have a longer chord length than the lower segment 107-2 of the partial ring wing 107, is farther back and thus acts as a rear wing.

The partial ring wing 107 may be secured to the fuselage 110 by motor arms 105. In this example, four motor arms 105-1, 105-3, 105-4, and 105-6 may be coupled to the fuselage 110 at one end, and extend from the fuselage 110 and couple to the partial ring wing 107 at a second end, thereby securing the partial ring wing 107 to the fuselage 110. In addition, motor arms 105-2, 105-5 may also extend from the fuselage 110 and couple to or support respective motors 101-2, 101-5 and propellers 104-2, 104-5, but motor arms 105-2, 105-5 may not couple to the partial ring wing 107.

In some implementations, the aerial vehicle may also include one or more stabilizer fins that extend from the fuselage 110 to the partial ring wing 107. The stabilizer fins may also have an airfoil shape. The stabilizer fins may extend generally vertically from the fuselage 110 to portions of the partial ring wing 107, e.g., upper segment 107-1 and/or lower segment 107-2. In other implementations, the stabilizer fins may be at other positions and/or orientations.

In further implementations, one or more of the stabilizer fins may extend from the fuselage 110 and not couple to the partial ring wing 107 or may extend from the partial ring wing 107 and not couple to the fuselage 110. In some implementations, one or more stabilizer fins may extend from the exterior of the partial ring wing 107, one or more stabilizer fins may extend from the interior of the partial ring wing 107, one or more stabilizer fins may extend from the fuselage 110, and/or one or more stabilizer fins may extend from the fuselage 110 and couple to the interior of the partial ring wing 107.

The fuselage 110, motor arms 105, stabilizer fins, and partial ring wing 107 of the aerial vehicle 100 may be formed of any one or more suitable materials, such as graphite, carbon fiber, plastics, metals, aluminum, steel, other materials, or combinations thereof.

Each of the propulsion mechanisms may be coupled to a respective motor arm 105 (or propulsion mechanism arm) such that the propulsion mechanism is substantially contained within a perimeter of the partial ring wing 107. For example, motor 101-1 and propeller 104-1 are coupled to motor arm 105-1, motor 101-2 and propeller 104-2 are coupled to motor arm 105-2, motor 101-3 and propeller 104-3 are coupled to motor arm 105-3, motor 101-4 and propeller 104-4 are coupled to motor arm 105-4, motor 101-5 and propeller 104-5 are coupled to motor arm 105-5, and motor 101-6 and propeller 104-6 are coupled to motor arm 105-6. In the illustrated example, each motor 101-1, 101-3, 101-4, 101-6 and corresponding propeller 104-1, 104-3, 104-4, 104-6 may be coupled at an approximate mid-point of the respective motor arm 105-1, 105-3, 105-4, and 105-6 between the fuselage 110 and the partial ring wing 107. In addition, motor 101-2 and propeller 104-2 may be coupled toward an end of motor arm 105-2, and motor 101-5 and propeller 104-5 may be coupled toward an end of motor arm 105-5. In other implementations, the propulsion mechanisms may be coupled at other locations along respective motor arms. Likewise, in some implementations, some of the propulsion mechanisms may be coupled to a mid-point of respective motor arms and some of the propulsion mechanisms may be coupled at other locations along respective motor arms (e.g., closer toward the fuselage 110 or closer toward the partial ring wing 107).

As illustrated, the propulsion mechanisms may be oriented at different angles with respect to each other. For example, motors 101-2, 101-5 and propellers 104-2, 104-5 may be aligned with the fuselage 110 such that the force generated by each of the motors 101-2, 101-5 and propellers 104-2, 104-5 is in-line or in the same direction or orientation as the fuselage 110. In the illustrated example, the aerial vehicle 100 is oriented for horizontal flight such that the fuselage 110 is oriented horizontally in the direction of travel. In such an orientation, the motors 101-2, 101-5 and propellers 104-2, 104-5 provide horizontal forces, also referred to herein as thrusting forces and act as thrusting propulsion mechanisms.

In comparison to motors 101-2, 101-5 and propellers 104-2, 104-5, each of motors 101-1, 101-3, 101-4, 101-6 and propellers 104-1, 104-3, 104-4, 104-6 may be offset or angled with respect to the orientation of the fuselage 110. When the aerial vehicle 100 is oriented horizontally as shown in FIG. 1 for horizontal flight, the motors 101-1, 101-3, 101-4, 101-6 and propellers 104-1, 104-3, 104-4, 104-6 may be used as propulsion mechanisms, providing thrust in a non-horizontal direction to cause the aerial vehicle to pitch, yaw, roll, heave and/or sway. In other implementations, during horizontal flight, the motors 101-1, 101-3, 101-4, 101-6 and propellers 104-1, 104-3, 104-4, 104-6 may be disabled such that they do not produce any forces, and the aerial vehicle 100 may be propelled aerially in a horizontal direction as a result of the lifting force from the aerodynamic shape of the partial ring wing 107 and the horizontal thrust produced by the thrusting propulsion mechanisms, e.g., motors 101-2, 101-5 and propellers 104-2, 104-5.

In some implementations, one or more segments of the partial ring wing 107 may include ailerons, control surfaces, and/or trim tabs that may be adjusted to control the aerial flight of the aerial vehicle 100. For example, one or more ailerons, control surfaces, and/or trim tabs may be included on the upper segment 107-1 of the partial ring wing 107, and/or one or more ailerons, control surfaces, and/or trim tabs may be included on the lower segment 107-2 of the partial ring wing 107. Further, one or more ailerons, control surfaces, and/or trim tabs may also be included on one or more of the side segments 107-3, 107-4, 107-5, 107-6. The ailerons, control surfaces, and/or trim tabs may be operable to control the pitch, yaw, and/or roll of the aerial vehicle during horizontal flight when the aerial vehicle 100 is oriented as illustrated in FIG. 1.

The angle of orientation of each of the motors 101 and propellers 104 may vary for different implementations. Likewise, in some implementations, the offset of the motors 101 and propellers 104 may each be the same, with some oriented in one direction and some oriented in another direction, each oriented different amounts, and/or in different directions.

In the illustrated example of FIG. 1, each propulsion mechanism may be oriented approximately thirty degrees with respect to the position of each respective motor arm 105-1, 105-2, 105-3, 105-4, 105-5, and 105-6. In addition, the direction of orientation of the propulsion mechanisms may be such that pairs of propulsion mechanisms are oriented toward one another. For example, a direction of thrust generation of the motor 101-1 and propeller 104-1 may be oriented approximately thirty degrees about the first motor arm 105-1 toward a direction of thrust generation of the motor 101-6 and propeller 104-6 that may also be oriented approximately thirty degrees about the sixth motor arm 105-6. Likewise, a direction of thrust generation of the motor 101-2 and propeller 104-2 may be oriented approximately thirty degrees about the second motor arm 105-2 and toward a direction of thrust generation of the motor 101-3 and propeller 104-3 that may also be oriented approximately thirty degrees about the third motor arm 105-3. Finally, a direction of thrust generation of the motor 101-4 and propeller 104-4 may be oriented approximately thirty degrees about the fourth motor arm 105-4 and toward a direction of thrust generation of the motor 101-5 and propeller 104-5 that may also be oriented approximately thirty degrees about the fifth motor arm 105-5. As illustrated, motors 101-2, 101-5 and propellers 104-2, 104-5, which are on opposing sides of the fuselage 110, may be aligned and oriented in a same first direction (in this example, horizontal). Motors 101-3, 101-6 and propellers 104-3, 104-6, which are on opposing sides of the fuselage 110, may be aligned and oriented in a same second direction, which is angled compared to the first direction. Motors 101-1, 101-4 and propellers 104-1, 104-4, which are on opposing sides of the fuselage 110, may be aligned and oriented in a same third direction, which is angled compared to the first direction and the second direction.

The example aerial vehicle 100 may also include a control system, including one or more processors, memories, controllers, power supplies, communication devices or interfaces, sensors, position sensors, sensorless estimators, input/output devices, or other components. In addition, the control system may include, execute, or implement the fault detection algorithms, processes, and techniques, as well as the various aerial vehicle control processes, described herein. Further details of an example control system of an aerial vehicle are described herein at least with respect to FIG. 10.

Although FIG. 1 illustrates an example implementation of an aerial vehicle 100, other example implementations of aerial vehicles may include the same, similar, or different combinations of various components described herein. For example, other aerial vehicles may include other numbers, configurations, or arrangements of motors, propellers, motor arms, wing segments or sections, and/or other components.

In example embodiments, the fault detection algorithms, processes, and techniques may be applied to various implementations of aerial vehicles. For example, the fault detection algorithms, processes, and techniques may be applied to implementations of aerial vehicles having multiple motors or electric drives that comprise the propulsion mechanisms, and in which each respective motor or electric drive includes at least one position sensor and at least one associated sensorless motor control estimator.

Figure 2:
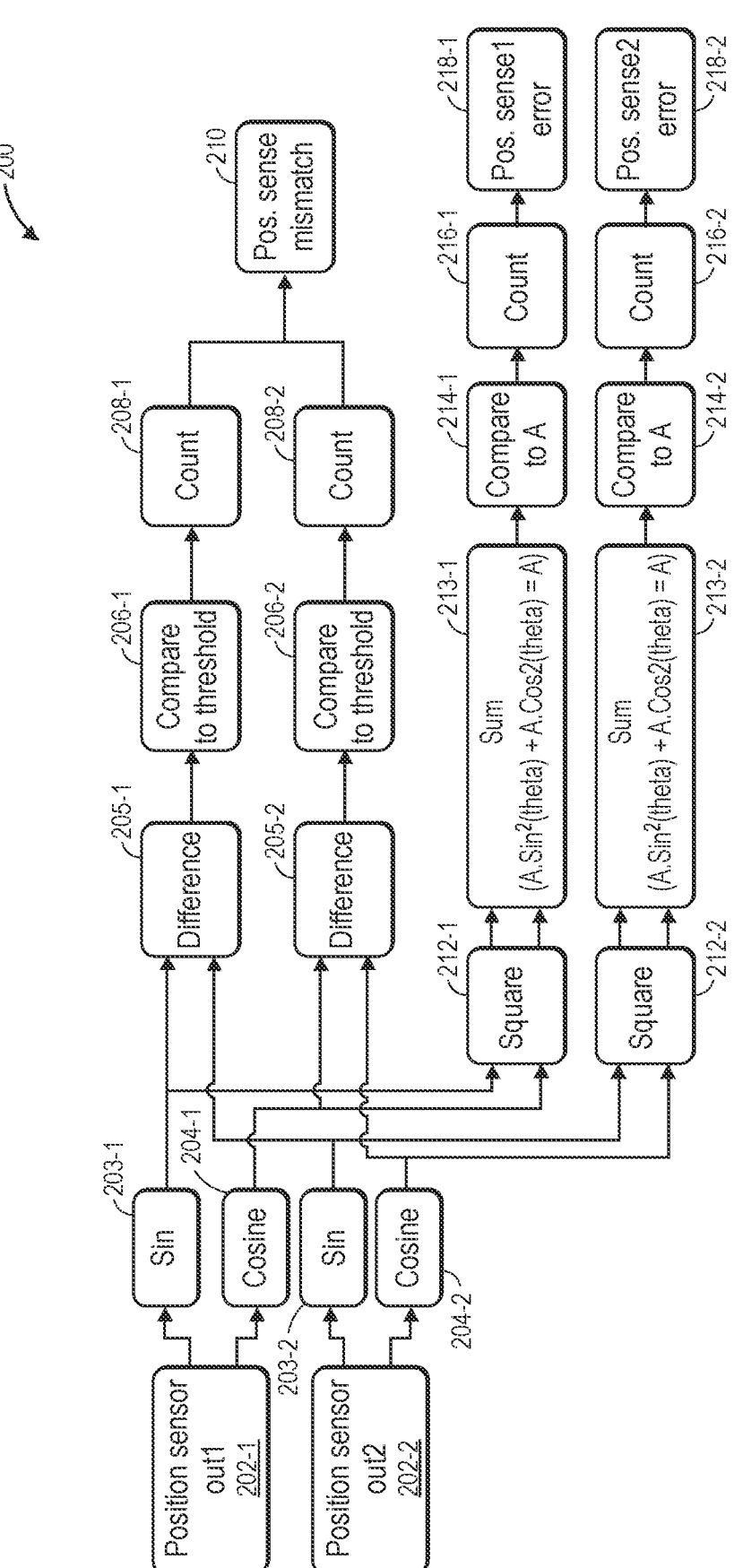
FIG. 2 is a schematic block diagram of an example position sensor error detection method, in accordance with implementations of the present disclosure.

FIG. 2 is a schematic block diagram 200 of an example position sensor error detection method, in accordance with implementations of the present disclosure.

Generally, outputs of a position sensor associated with a motor or electric drive may include two sinusoidal signals, each normalized and ninety degrees apart from each other. The two sinusoidal signals may generally be referred to as a sine signal and a cosine signal. In addition, position and speed data or information may be derived using the sine and cosine signals, for example, using arctan or other common methods.

Some faults or failure modes associated with the sinusoidal signals may include one signal being disconnected, both signals being disconnected, one signal being shorted to ground, or both signals being shorted to ground. Other faults or failure modes associated with the sinusoidal signals may include faults associated with an integrated circuit, one or more dies of the integrated circuit, or other related faults. Additional faults or failure modes associated with the sinusoidal signals may include software or firmware errors. Further faults or failure modes associated with the sinusoidal signals may include signal distortion or other external factors.

In example embodiments described herein, two position sensors may be associated with a motor or electric drive. In some examples, the two position sensors may comprise two channels of a dual channel resolver or encoder associated with a motor or electric drive. A dual channel resolver may also be referred to as a dual die integrated circuit (IC), in which two silicon dies are associated with a single physical integrated circuit. Each silicon die may have multiple inputs and outputs, such as a positive direct current (DC+) input, a negative direct current (DC−) input, a sine signal output, and a cosine signal output. Further, each of the two silicon dies may perform position and speed sensing at least semi-independently from each other.

Referring to FIG. 2, in example embodiments, a first channel of the dual channel resolver may refer to position sensor data 202-1 received from a first die of the dual die IC, and a second channel of the dual channel resolver may refer to position sensor data 202-2 received from a second die of the dual die IC. In some example implementations, position sensor data from the first channel may be used for both fault detection and motor control, and position sensor data from the second channel may be used only for fault detection. In other example implementations, position sensor data from the first channel may be used for both fault detection and motor control, and position sensor data from the second channel may also be used for both fault detection and motor control.

The position sensor data 202-1 received from the first channel or first die may comprise two sinusoidal signals, e.g., a sine signal 203-1 and a cosine signal 204-1. In addition, the position sensor data 202-2 received from the second channel or second die may comprise two sinusoidal signals, e.g., a sine signal 203-2 and a cosine signal 204-2. The sine and cosine signals 203-1, 203-2, 204-1, 204-2 may be processed to determine faults or failure modes associated with one or both of the position sensors and associated motors or electric drives, as further described herein.

In example embodiments, signals from the two position sensors may be compared with each other in order to determine faults associated with one or both of the position sensors. As shown in FIG. 2, the sine signal 203-1 from the position sensor data 202-1 of the first position sensor may be compared with the sine signal 203-2 from the position sensor data 202-2 of the second position sensor to determine a difference 205-1. In addition, the cosine signal 204-1 from the position sensor data 202-1 of the first position sensor may be compared with the cosine signal 204-2 from the position sensor data 202-2 of the second position sensor to determine a difference 205-2. In nominal operation of the two position sensors, the signals output by the two position sensors should be identical within some threshold, such that the differences between the signals of the two position sensors should be zero within some threshold.

The difference 205-1 between the sine signals of the two position sensors may then be compared with a threshold value 206-1. In addition, the difference 205-2 between the cosine signals of the two position sensors may be compared with a threshold value 206-2. For example, the threshold values 206-1, 206-2 may comprise relatively small values close to zero.

If the difference 205-1 between the sine signals of the two position sensors is greater than the threshold value, a count 208-1 associated with fault determination may be incremented. Likewise, if the difference 205-2 between the cosine signals of the two position sensors is greater than the threshold value, a count 208-2 associated with fault determination may be incremented.

As the counts 208-1, 208-2 are incremented, the counts 208-1, 208-2 may be compared with a threshold value or amount to determine whether there is a fault, e.g., a position sensor mismatch 210 between the two position sensors. For example, the threshold value or amount associated with the counts 208-1, 208-2 may comprise a number or value, e.g., 5, 10, or other numbers or values. In addition, the threshold value or amount associated with the counts 208-1, 208-2 may comprise a time or time duration, e.g., approximately 200 ms, approximately 300 ms, approximately 500 ms, approximately 1 s, or other time durations.

In some examples, a fault may be determined based on a total or aggregate number of counts 208-1, 208-2 associated with differences 205-1, 205-2 that are above the threshold values 206-1, 206-2. In other examples, a fault may be determined based on a total number, time, or time duration of consecutive counts 208-1, 208-2 associated with differences 205-1, 205-2 that are above the threshold values 206-1, 206-2. In addition, the counts 208-1, 208-2 may be reset or zeroed out when the determined differences 205-1, 205-2 are not greater than the threshold values 206-1, 206-2.

In additional example embodiments, signals from a single position sensor may be processed in order to determine faults associated with the single position sensor. As shown in FIG. 2, for the first position sensor, the sine signal 203-1 from the position sensor data 202-1 may be squared 212-1, and the cosine signal 204-1 from the position sensor data 202-1 may also be squared 212-1. Then, the squared sine signal and the squared cosine signal for the first position sensor may be summed 213-1.

In nominal operation of a single position sensor, the sum of the squares of the signals output by the single position sensor should be equal to one within some threshold. Thus, the sum of the squares of the sine signal and the cosine signal for the first position sensor may be compared with a threshold value 214-1. For example, the threshold value 214-1 may comprise values or ranges relatively close to or around the value of one.

If the sum of the squares of the sine signal and the cosine signal for the first position sensor is greater than or outside a range of the threshold value 214-1, a count 216-1 associated with fault determination may be incremented.

As the count 216-1 is incremented, the count 216-1 may be compared with a threshold value or amount to determine whether there is a fault, e.g., a position sensor error 218-1 of the first position sensor. For example, the threshold value or amount associated with the count 216-1 may comprise a number or value, e.g., 5, 10, or other numbers or values. In addition, the threshold value or amount associated with the count 216-1 may comprise a time or time duration, e.g., approximately 200 ms, approximately 300 ms, approximately 500 ms, approximately 1 s, or other time durations.

In some examples, a fault may be determined based on a total or aggregate number of the count 216-1 associated with a sum of the squares of the sine signal and the cosine signal for the first position sensor that is greater than or outside a range of the threshold value 214-1. In other examples, a fault may be determined based on a total number, time, or time duration of consecutive counts 216-1 associated with a sum of the squares of the sine signal and the cosine signal for the first position sensor that is greater than or outside a range of the threshold value 214-1. In addition, the count 216-1 may be reset or zeroed out when the sum of the squares of the sine signal and the cosine signal is not greater than or outside a range of the threshold value 214-1.

Likewise, for the second position sensor, the sine signal 203-2 from the position sensor data 202-2 may be squared

212-2, and the cosine signal 204-2 from the position sensor data 202-2 may also be squared 212-2. Then, the squared sine signal and the squared cosine signal for the second position sensor may be summed 213-2.

In nominal operation of a single position sensor, the sum of the squares of the signals output by the single position sensor should be equal to one within some threshold. Thus, the sum of the squares of the sine signal and the cosine signal for the second position sensor may be compared with a threshold value 214-2. For example, the threshold value 214-2 may comprise values or ranges relatively close to or around the value of one.

If the sum of the squares of the sine signal and the cosine signal for the second position sensor is greater than or outside a range of the threshold value 214-2, a count 216-2 associated with fault determination may be incremented.

As the count 216-2 is incremented, the count 216-2 may be compared with a threshold value or amount to determine whether there is a fault, e.g., a position sensor error 218-2 of the second position sensor. For example, the threshold value or amount associated with the count 216-2 may comprise a number or value, e.g., 5, 10, or other numbers or values. In addition, the threshold value or amount associated with the count 216-2 may comprise a time or time duration, e.g., approximately 200 ms, approximately 300 ms, approximately 500 ms, approximately 1 s, or other time durations.

In some examples, a fault may be determined based on a total or aggregate number of the count 216-2 associated with a sum of the squares of the sine signal and the cosine signal for the second position sensor that is greater than or outside a range of the threshold value 214-2. In other examples, a fault may be determined based on a total number, time, or time duration of consecutive counts 216-2 associated with a sum of the squares of the sine signal and the cosine signal for the second position sensor that is greater than or outside a range of the threshold value 214-2. In addition, the count 216-2 may be reset or zeroed out when the sum of the squares of the sine signal and the cosine signal is not greater than or outside a range of the threshold value 214-2.

Figure 3:
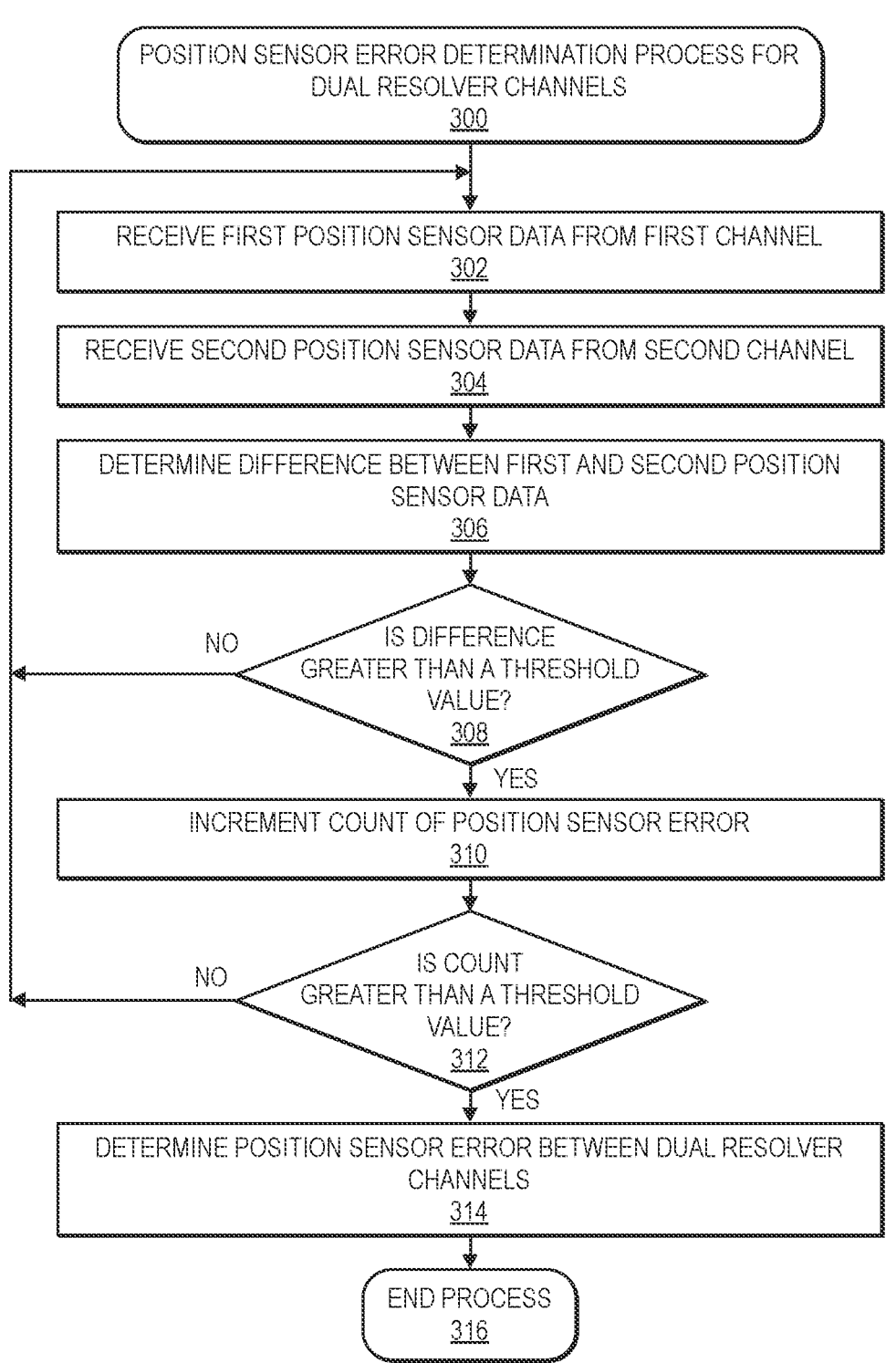
FIG. 3 is a flow diagram illustrating an example position sensor error determination process for dual resolver channels, in accordance with implementations of the present disclosure.

FIG. 3 is a flow diagram illustrating an example position sensor error determination process for dual resolver channels 300, in accordance with implementations of the present disclosure.

The process 300 may begin by receiving first position sensor data from a first channel, as at 302. For example, the first position sensor data may comprise a sine signal or a cosine signal that is output from the first position sensor via the first channel. Further, a control system, controller, or processor may receive the first position sensor data via the first channel.

The process 300 may continue by receiving second position sensor data from a second channel, as at 304. For example, the second position sensor data may comprise a sine signal or a cosine signal that is output from the second position sensor via the second channel. Further, a control system, controller, or processor may receive the second position sensor data via the second channel.

The process 300 may proceed by determining a difference between the first and second position sensor data, as at 306. For example, the sine signal from the first position sensor may be compared with the sine signal from the second position sensor to determine a difference between the sine signals. In addition, the cosine signal from the first position sensor may be compared with the cosine signal from the second position sensor to determine a difference between the cosine signals. Further, a control system, controller, or processor may determine a difference between the first and second position sensor data.

The process 300 may continue to determine if the difference is greater than a threshold value, as at 308. For example, in nominal operation of position sensors, the difference should be equal to zero within a threshold value. The threshold value may comprise various values or ranges, e.g., one or more values or ranges relatively close to zero, such as between approximately −0.2 and approximately 0.2, between approximately −0.3 and approximately 0.3, between approximately −0.5 and approximately 0.5, between approximately −0.6 and approximately 0.6, between approximately −1.0 and approximately 1.0, etc. Further, a control system, controller, or processor may determine if the difference between the first and second position sensor data is greater than a threshold value or outside a threshold range.

If the difference between the first and second position sensor data is not greater than a threshold value or outside a threshold range, the process 300 may return to step 302 to continue to receive and process position sensor data via the first and second channels.

If, however, the difference between the first and second position sensor data is greater than a threshold value or outside a threshold range, the process 300 may proceed to increment a count of a position sensor error, as at 310. For example, the position sensor error may comprise or indicate a mismatch between the position sensor data of the first and second position sensors. The count may comprise a total or aggregate number of determined differences that are greater than the threshold value or outside the threshold range. In some examples, the count may comprise a total number, time, or time duration of consecutive determined differences that are greater than the threshold value or outside the threshold range. In such examples, the count may be reset or zeroed out in response to a determination that the difference between the first and second position sensor data is not greater than a threshold value or outside a threshold range at step 308. Moreover, in order to reset the count, the difference between the first and second position sensor data may be determined to be smaller than a different threshold value or range, e.g., a smaller threshold value or range, in order to apply a hysteresis function and prevent erroneous resetting. Further, a control system, controller, or processor may increment a count of the position sensor error.

The process 300 may then continue with determining whether the count is greater than a threshold value, as at 312. For example, the current value of the count may be compared with a threshold value associated with the count. The threshold value may comprise various values, e.g., approximately 5, approximately 10, etc. In addition, the threshold value may comprise a time or time duration, e.g., approximately 200 ms, approximately 300 ms, approximately 500 ms, approximately 1 s, or other time durations. Further, a control system, controller, or processor may determine if the count is greater than a threshold value.

If the count is not greater than the threshold value, the process 300 may return to step 302 to continue to receive and process position sensor data via the first and second channels.

If, however, the count is greater than the threshold value, the process 300 may proceed with determining a position sensor error between the dual resolver channels, as at 314. For example, the position sensor error may comprise or indicate a mismatch between the position sensor data of the first and second position sensors. As a result, the determined position sensor error may indicate an error with one or both of the two position sensors and associated motors or electric drives. Further, a control system, controller, or processor may determine the position sensor error between the dual resolver channels.

The process 300 may then end, as at 316.

FIG. 4 is a flow diagram illustrating an example position sensor error determination process for an individual channel 400, in accordance with implementations of the present disclosure.

The process 400 may begin by receiving sine position sensor data from a channel, as at 402. For example, the position sensor data may comprise a sine signal that is output from a single position sensor via the channel. Further, a control system, controller, or processor may receive the sine position sensor data via the channel.

The process 400 may continue by receiving cosine position sensor data from a channel, as at 404. For example, the position sensor data may comprise a cosine signal that is output from the single position sensor via the channel. Further, a control system, controller, or processor may receive the cosine position sensor data via the channel.

The process 400 may proceed by calculating a square of the sine position sensor data, as at 406. For example, the sine signal of the position sensor data may be squared. Further, a control system, controller, or processor may calculate the square of the sine signal of the position sensor data.

The process 400 may continue to calculate a square of the cosine position sensor data, as at 408. For example, the cosine signal of the position sensor data may be squared. Further, a control system, controller, or processor may calculate the square of the cosine signal of the position sensor data.

The process 400 may proceed to calculate a sum of the squared sine and squared cosine position sensor data, as at 410. For example, the squared sine signal of the position sensor data and the squared cosine signal of the position sensor data may be summed or added. Further, a control system, controller, or processor may calculate the sum of the squares of the sine signal and the cosine signal of the position sensor data.

The process 400 may continue with determining if the sum is equal to one within a threshold, as at 412. For example, in nominal operation of a single position sensor, the sum of the squares of the sine and cosine signals should be equal to one within a threshold value. The threshold value may comprise various values or ranges relatively close to or around the value of one, e.g., a range of approximately 0.8 to approximately 1.2, a range of approximately 0.7 to approximately 1.3, a range of approximately 0.5 to approximately 1.5, a range of approximately 0.4 to approximately 1.6, a range of approximately 0.0 to approximately 2.0, etc. Further, a control system, controller, or processor may determine if the sum is equal to one within a threshold value.

If the sum of the squares of the sine and cosine signals is equal to one within a threshold value or a threshold range, the process 400 may return to step 402 to continue to receive and process position sensor data via the channel.

If, however, the sum of the squares of the sine and cosine signals is not equal to one within a threshold value or a threshold range, the process 400 may proceed with incrementing a count of a position sensor error, as at 414. For example, the position sensor error may comprise or indicate an error associated with the single position sensor and associated motor or electric drive. The count may comprise a total or aggregate number of determined sums that are not equal to one within the threshold value or the threshold range. In some examples, the count may comprise a total number, time, or time duration of consecutive determined sums that are not equal to one within the threshold value or the threshold range. In such examples, the count may be reset or zeroed out in response to a determination that the sum of the squares of the sine and cosine signals is equal to one within a threshold value or a threshold range at step 412. Moreover, in order to reset the count, the sum of the squares of the sine and cosine signals may be determined to be within a different threshold value or range, e.g., a smaller threshold value or range, in order to apply a hysteresis function and prevent erroneous resetting. Further, a control system, controller, or processor may increment a count of the position sensor error.

The process 400 may then continue with determining whether the count is greater than a threshold value, as at 416. For example, the current value of the count may be compared with a threshold value associated with the count. The threshold value may comprise various values, e.g., approximately 5, approximately 10, etc. In addition, the threshold value may comprise a time or time duration, e.g., approximately 200 ms, approximately 300 ms, approximately 500 ms, approximately 1 s, or other time durations. Further, a control system, controller, or processor may determine if the count is greater than a threshold value.

If the count is not greater than the threshold value, the process 400 may return to step 402 to continue to receive and process position sensor data via the channel.

If, however, the count is greater than the threshold value, the process 400 may proceed with determining a position sensor error for the individual channel, as at 418. For example, the position sensor error may comprise or indicate an error associated with the single position sensor and associated motor or electric drive. Further, a control system, controller, or processor may determine the position sensor error for the individual channel.

The process 400 may then end, as at 420.

Figure 5:
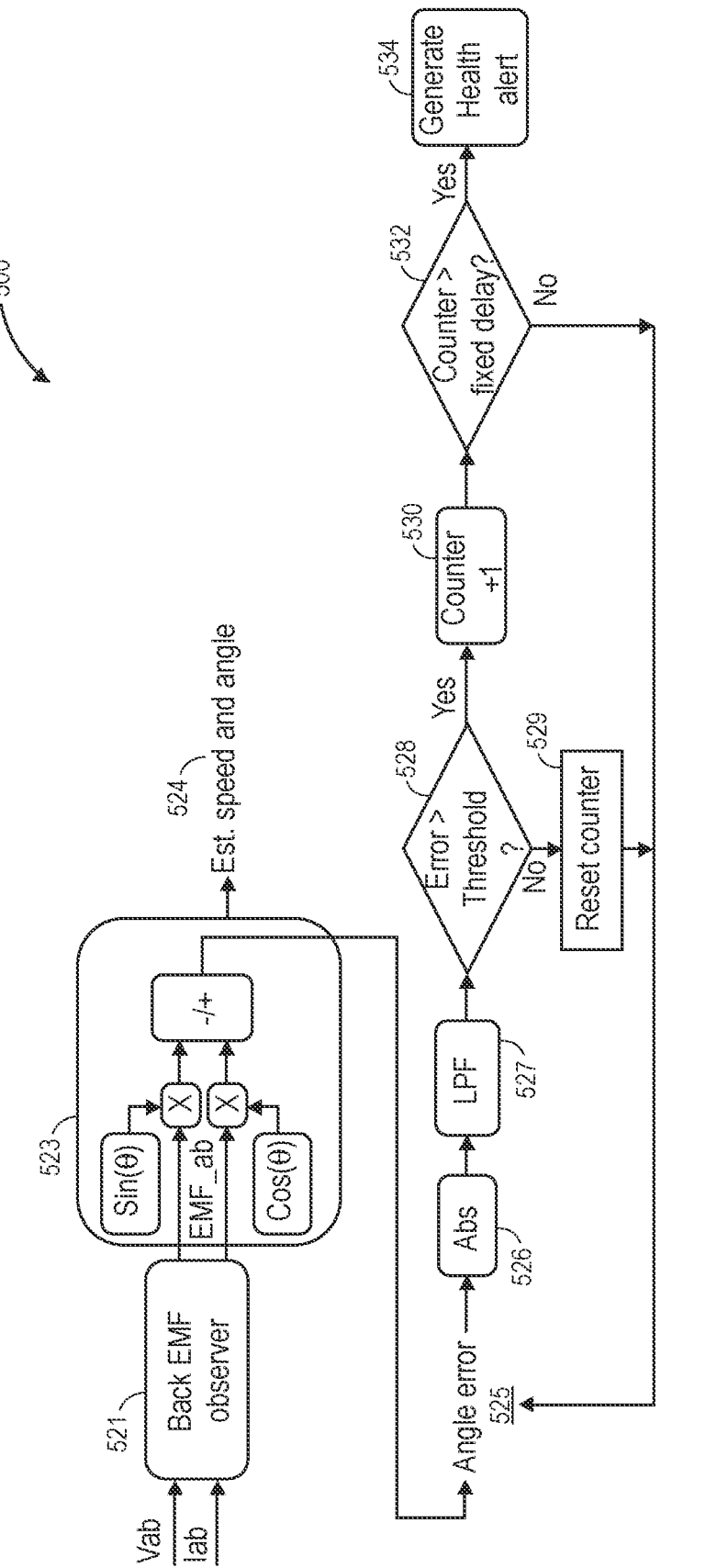
FIG. 5 is a schematic block diagram of an example sensorless estimator error detection method, in accordance with implementations of the present disclosure.

FIG. 5 is a schematic block diagram 500 of an example sensorless estimator error detection method, in accordance with implementations of the present disclosure.

Generally, sensorless position and speed estimators associated with motors or electric drives may receive three phase current signals, e.g., $I_a$, $I_b$, $I_c$, and generate a back EMF (back electromotive force) estimation, which may also be expressed in the a, b, c domain. In addition, the back EMF estimation may be converted to the alpha-beta domain, and the sensorless estimator may generate an estimated position and estimated speed for the associated motor or electric drive.

The sensorless estimator may also calculate angle error according to Equation 1:

$$\text{Error} = E_\beta \cdot \cos \theta - E_\alpha \cdot \sin \theta \qquad (1)$$

where Error is the calculated angle error, $E_\beta$ is the beta component of the back EMF estimation, $E_\alpha$ is the alpha component of the back EMF estimation, and $\theta$ is the estimated angle feedback from the sensorless estimator. In nominal operation of the sensorless estimator and associated motor or electric drive, the angle error, i.e., Error, should be equal to zero within a threshold. For example, the threshold value may comprise values or ranges relatively close to or around the value of zero.

As shown in FIG. 5, a back EMF observer 521, which may form a portion of a sensorless estimator, may receive various input signals, e.g., voltage $V_{ab}$ and current $I_{ab}$ signals, and generate a back EMF estimation, e.g., EMF_ab.

Generally, the sensorless estimator may generate an estimated position or angle and estimated speed 524 based on the various input signals.

In addition, an angle error calculation 523 may be performed based on the back EMF estimation and the estimated angle feedback from the sensorless estimator, e.g., using Equation 1 herein, in order to generate an angle error 525. As further described herein, the angle error 525 may be further processed to determine faults or failure modes associated with the sensorless estimator and associated motor or electric drive.

In example embodiments, the angle error 525 may generally comprise an alternating current (AC) value or signal. Then, an absolute value 526 of the angle error 525 may be determined or calculated, such that only positive values of the angle error remain. In addition, a low pass filter 527 may be applied to the positive values of the angle error, in order to remove signal oscillations and/or high frequency noise associated with the angle error value or signal.

In some example embodiments, a saturation operation may also be applied to the filtered, positive values of the angle error, such that the values of the angle error are all within upper and lower limit values. For example, any values higher than the upper limit value may be replaced with or substituted by the upper limit value, and any values lower than the lower limit value may be replaced with or substituted by the lower limit value. In additional example embodiments, a hysteresis operation may also be applied to the saturated, filtered, positive values of the angle error, in order to remove or minimize sensitivity to small changes or perturbations, e.g., relative to a threshold value related to fault determination.

The angle error 525 value or signal, e.g., after taking the absolute value 526 and processing with a low pass filter 527, and potentially also after processing with a saturation operation and/or a hysteresis operation, may then be compared with a threshold value 528. For example, the threshold value 528 may comprise relatively small values or ranges close to zero, such as between approximately −0.2 and approximately 0.2, between approximately −0.3 and approximately 0.3, between approximately −0.5 and approximately 0.5, between approximately −0.6 and approximately 0.6, between approximately −1.0 and approximately 1.0, etc.

If the angle error 525 is greater than the threshold value, a counter 530 associated with fault determination may be incremented. However, if the angle error 525 is not greater than the threshold value, the counter may be reset or zeroed out 529, e.g., so that the counter 530 may generally track or monitor a total number, time, or time duration of consecutive determinations of the angle error 525 being greater than the threshold value in order to make a determination of fault or failure mode of the sensorless estimator.

As the counter 530 is incremented, the counter 530 may be compared with a threshold value or amount 532 to determine whether there is a fault, e.g., a sensorless estimator error. For example, the threshold value or amount associated with the counter 530 may comprise a number or value, e.g., 5, 10, or other numbers or values. In addition, the threshold value or amount associated with the counter 530 may comprise a time or time duration, e.g., approximately 200 ms, approximately 300 ms, approximately 500 ms, approximately 1 s, or other time durations.

In some examples, a fault may be determined or generated, e.g., generate health alert 534 for the sensorless estimator and associated motor or electric drive, based on a total or aggregate number of counts by the counter 530 associated with the angle error 525 being greater than the threshold value 528. In other examples, a fault may be determined for the sensorless estimator and associated motor or electric drive based on a total number, time, or time duration of consecutive counts by the counter 530 associated with the angle error 525 being greater than the threshold value 528.

Figure 6:
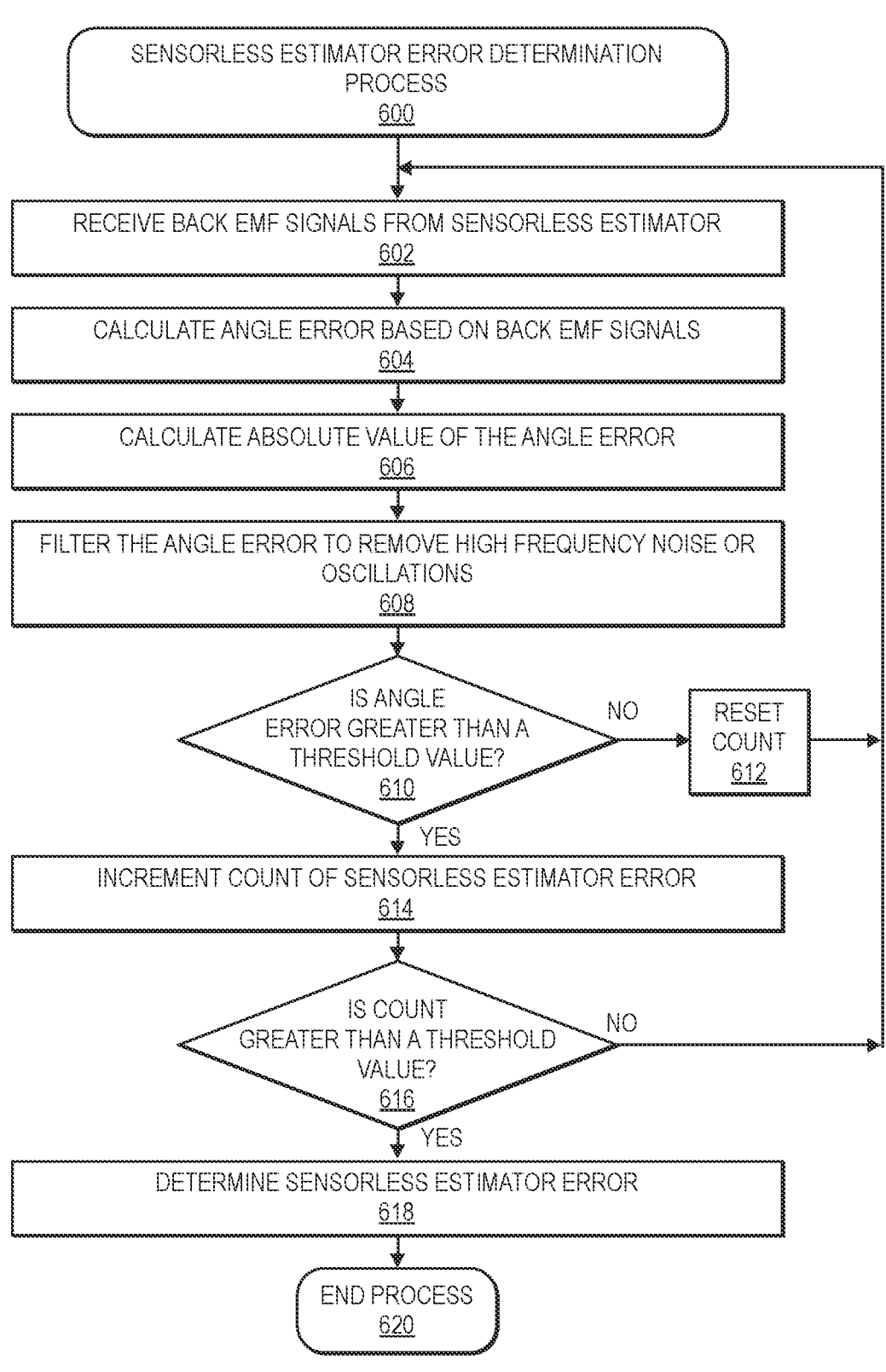
FIG. 6 is a flow diagram illustrating an example sensorless estimator error determination process, in accordance with implementations of the present disclosure.

FIG. 6 is a flow diagram illustrating an example sensorless estimator error determination process 600, in accordance with implementations of the present disclosure.

The process 600 may begin by receiving back EMF signals from a sensorless estimator, as at 602. For example, a back EMF estimator, which may form a part of the sensorless estimator, may receive voltage signals, current signals, or various other signals, and may generate a back EMF estimation. The back EMF estimation may be expressed in or converted to the alpha-beta domain. Further, a control system, controller, or processor may receive back EMF signals from a sensorless estimator to generate a back EMF estimation.

The process 600 may continue by calculating an angle error based on the back EMF signals, as at 604. For example, based on the back EMF estimation and an angle feedback value, an angle error may be calculated according to Equation 1 herein. In addition, the calculation of the angle error may also form a part of the sensorless estimator. Further, a control system, controller, or processor may calculate the angle error based on the back EMF estimation.

The process 600 may proceed by calculating an absolute value of the angle error, as at 606. For example, the angle error may comprise an alternating current signal, and the angle error may be processed to take absolute values of the signal, such that only positive values of the angle error remain. Further, a control system, controller, or processor may calculate an absolute value of the angle error.

The process 600 may continue to filter the angle error to remove high frequency noise or oscillations, as at 608. For example, the positive values of the angle error may be processed by a low pass filter that is configured to remove high frequency noise and/or signal oscillations. In additional examples, further processing may be performed on the angle error, such as a saturation operation within upper and lower limit values and/or a hysteresis operation configured to remove or minimize sensitivity to small changes or perturbations. Further, a control system, controller, or processor may filter the angle error and/or perform additional processing on the angle error.

The process 600 may proceed to determine if the angle error is greater than a threshold value, as at 610. For example, in nominal operation of a sensorless estimator, the angle error should be equal to zero within a threshold value. The threshold value may comprise various values or ranges, e.g., one or more values or ranges relatively close to zero, such as between approximately −0.2 and approximately 0.2, between approximately −0.3 and approximately 0.3, between approximately −0.5 and approximately 0.5, between approximately −0.6 and approximately 0.6, between approximately −1.0 and approximately 1.0, etc. Further, a control system, controller, or processor may determine if the angle error is greater than a threshold value.

If the angle error is not greater than a threshold value or outside a threshold range, the process 600 may reset or zero out the count 612, which is further described herein, and then may return to step 602 to continue to receive and process back EMF signals and calculated angle error from a sensorless estimator. Moreover, in order to reset the count, the angle error may be determined to be within a different threshold value or range, e.g., a smaller threshold value or range, in order to apply a hysteresis function and prevent erroneous resetting.

If, however, the angle error is greater than a threshold value or outside a threshold range, the process 600 may continue with incrementing a count of a sensorless estimator error, as at 614. For example, the sensorless estimator error may comprise or indicate an error related to the sensorless estimator or associated motor or electric drive. The count may comprise a total or aggregate number of determined angle errors that are greater than the threshold value or outside the threshold range. In some examples, the count may comprise a total number, time, or time duration of consecutive determined angle errors that are greater than the threshold value or outside the threshold range. Further, a control system, controller, or processor may increment a count of the sensorless estimator error.

The process 600 may then proceed with determining whether the count is greater than a threshold value, as at 616. For example, the current value of the count may be compared with a threshold value associated with the count. The threshold value may comprise various values, e.g., approximately 5, approximately 10, etc. In addition, the threshold value may comprise a time or time duration, e.g., approximately 200 ms, approximately 300 ms, approximately 500 ms, approximately 1 s, or other time durations. Further, a control system, controller, or processor may determine if the count is greater than a threshold value.

If the count is not greater than the threshold value, the process 600 may return to step 602 to continue to receive and process back EMF signals and calculated angle error from a sensorless estimator.

If, however, the count is greater than the threshold value, the process 600 may continue by determining a sensorless estimator error, as at 618. For example, the sensorless estimator error may comprise or indicate an error related to the sensorless estimator or associated motor or electric drive. Further, a control system, controller, or processor may determine the sensorless estimator error.

The process 600 may then end, as at 620.

Figure 7:
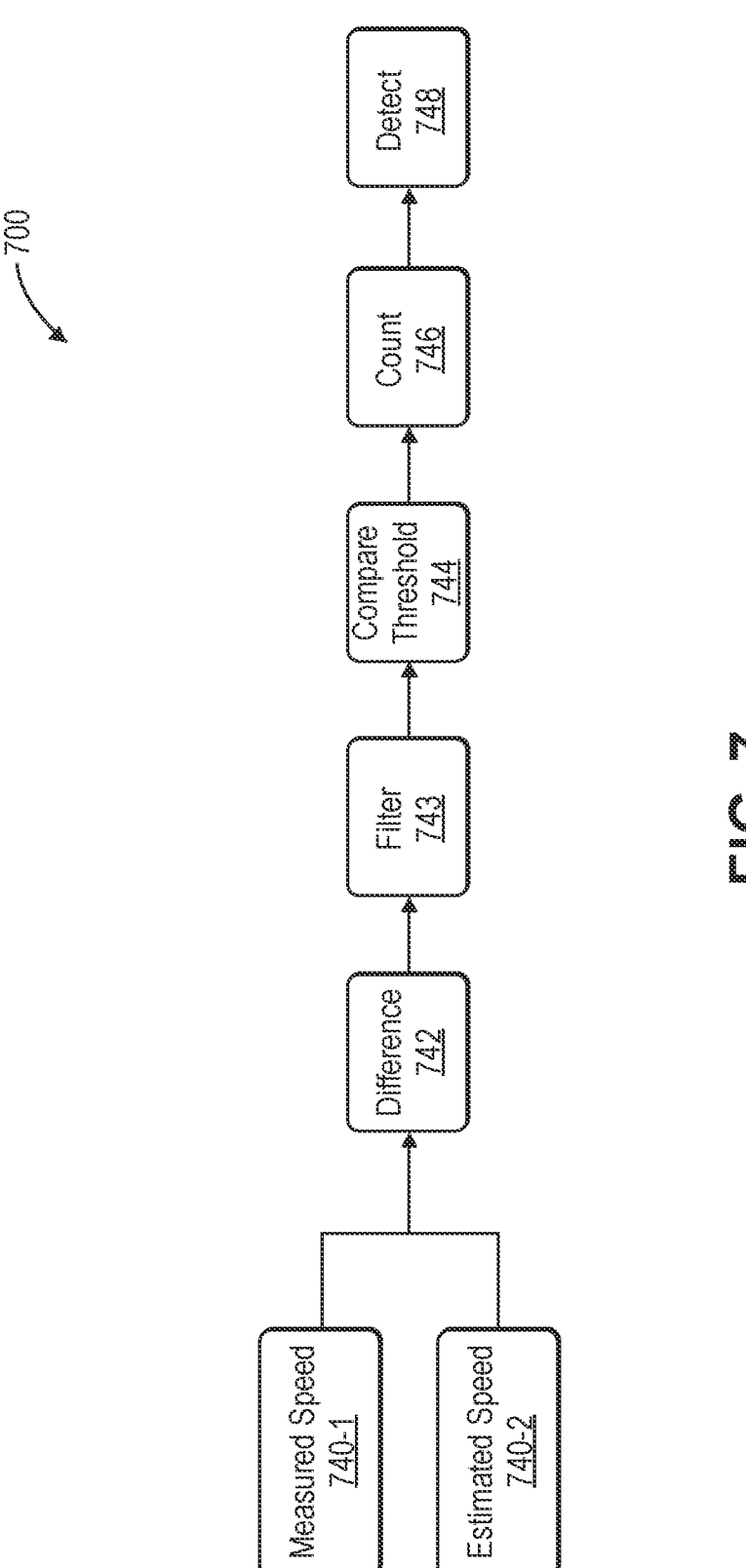
FIG. 7 is a schematic block diagram of an example measured and estimated speed difference detection method, in accordance with implementations of the present disclosure.

FIG. 7 is a schematic block diagram 700 of an example measured and estimated speed difference detection method, in accordance with implementations of the present disclosure.

In example embodiments having at least one position sensor and also a sensorless estimator associated with a respective motor or electric drive, position and speed data or information may be received from both sources, e.g., the at least one position sensor and the sensorless estimator. For example, the at least one position sensor may provide or output measured position data and measured speed data. In addition, the sensorless estimator may provide or output estimated position data and estimated speed data.

Generally, in nominal operation, measured position data from the at least one position sensor and estimated position data from the sensorless estimator may be approximately equal. However, position data may be more dynamic or change more rapidly over time, such that comparing measured position data and estimated position data may be difficult and/or more prone to false positive determinations of differences between the position data from the different sources.

In nominal operation, measured speed data from the at least one position sensor and estimated speed data from the sensorless estimator may also be approximately equal. Further, because speed data may be less dynamic or change less rapidly over time as compared to position data, comparing measured speed data and estimated speed data may provide more reliable determinations of differences between the speed data from the different sources, with fewer, reduced, or minimized false positive determinations.

The comparison of measured speed data and estimated speed data may identify or indicate faults or failure modes of one or both of the different sources, e.g., at least one position sensor and/or a sensorless estimator, even in situations in which no fault or failure mode may be determined based on position sensor data from the at least one position sensor individually, and also in which no fault or failure mode may be determined based on sensorless estimator data from the sensorless estimator individually. For example, a mismatch or difference between the measured speed data and the estimated speed data may indicate a fault or failure mode associated with one or both of the at least one position sensor or the sensorless estimator.

In addition, in situations in which a fault or failure mode is determined based on position sensor data from the at least one position sensor individually, and/or in which a fault or failure mode is determined based on sensorless estimator data from the sensorless estimator individually, the comparison of measured speed data and estimated speed data may additionally identify or indicate a fault or failure mode. For example, a mismatch or difference between the measured speed data and the estimated speed data may further indicate a fault or failure mode associated with one or both of the at least one position sensor or the sensorless estimator.

As shown in FIG. 7, measured speed 740-1 may be received from a position sensor associated with a motor or electric drive, and estimated speed 740-2 may be received from a sensorless estimator associated with the same motor or electric drive. In nominal operation, the measured speed 740-1 and the estimated speed 740-2 should be approximately equal within a threshold value.

Then, the measured speed 740-1 from the position sensor data of the position sensor may be compared with the estimated speed 740-2 from the estimated data of the sensorless estimator to determine a difference 742. In nominal operation of the at least one position sensor and the sensorless estimator, the measured speed 740-1 and the estimated speed 740-2 output by the two different sources should be identical within some threshold, such that the difference between the speeds 740-1, 740-2 of the two different sources should be zero within some threshold.

In example embodiments, the difference 742 may generally comprise an alternating current (AC) value or signal. Then, an absolute value of the difference 742 may be determined or calculated, such that only positive values of the difference 742 remain. In addition, a low pass filter may be applied to the positive values of the difference, in order to remove signal oscillations and/or high frequency noise associated with the difference value or signal.

In some example embodiments, a saturation operation may also be applied to the filtered, positive values of the difference, such that the values of the difference are all within upper and lower limit values. For example, any values higher than the upper limit value may be replaced with or substituted by the upper limit value, and any values lower than the lower limit value may be replaced with or substituted by the lower limit value. In additional example embodiments, a hysteresis operation may also be applied to the saturated, filtered, positive values of the difference, in order to remove or minimize sensitivity to small changes or perturbations, e.g., relative to a threshold value related to fault determination.

The difference 742 value or signal, e.g., after taking the absolute value and processing with a low pass filter, and potentially also after processing with a saturation operation and/or a hysteresis operation, may then be compared with a threshold value 744. For example, the threshold value 744 may comprise relatively small values or ranges close to zero, such as between approximately −0.2 and approximately 0.2, between approximately −0.3 and approximately 0.3, between approximately −0.5 and approximately 0.5, between approximately −0.6 and approximately 0.6, between approximately −1.0 and approximately 1.0, etc.

If the difference 742 is greater than the threshold value, a counter 746 associated with fault determination may be incremented. However, if the difference 742 is not greater than the threshold value, the counter may be reset or zeroed out, e.g., so that the counter 746 may generally track or monitor a total number, time, or time duration of consecutive determinations of the difference 742 being greater than the threshold value in order to make a determination of fault or failure mode associated with a mismatch or difference of speed data from the at least one position sensor and/or the sensorless estimator.

As the counter 746 is incremented, the counter 746 may be compared with a threshold value or amount to determine whether there is a fault, e.g., a mismatch or difference between speed data from the at least one position sensor and the sensorless estimator. For example, the threshold value or amount associated with the counter 746 may comprise a number or value, e.g., 5, 10, or other numbers or values. In addition, the threshold value or amount associated with the counter 746 may comprise a time or time duration, e.g., approximately 200 ms, approximately 300 ms, approximately 500 ms, approximately 1 s, or other time durations.

In some examples, a fault may be determined, e.g., detect fault 748 for the speed data from the at least one position sensor and/or the sensorless estimator and associated motor or electric drive, based on a total or aggregate number of counts by the counter 746 associated with the difference 742 being greater than the threshold value 744. In other examples, a fault may be determined for the speed data from the at least one position sensor and/or the sensorless estimator and associated motor or electric drive based on a total number, time, or time duration of consecutive counts by the counter 746 associated with the difference 742 being greater than the threshold value 744.

Figure 8:
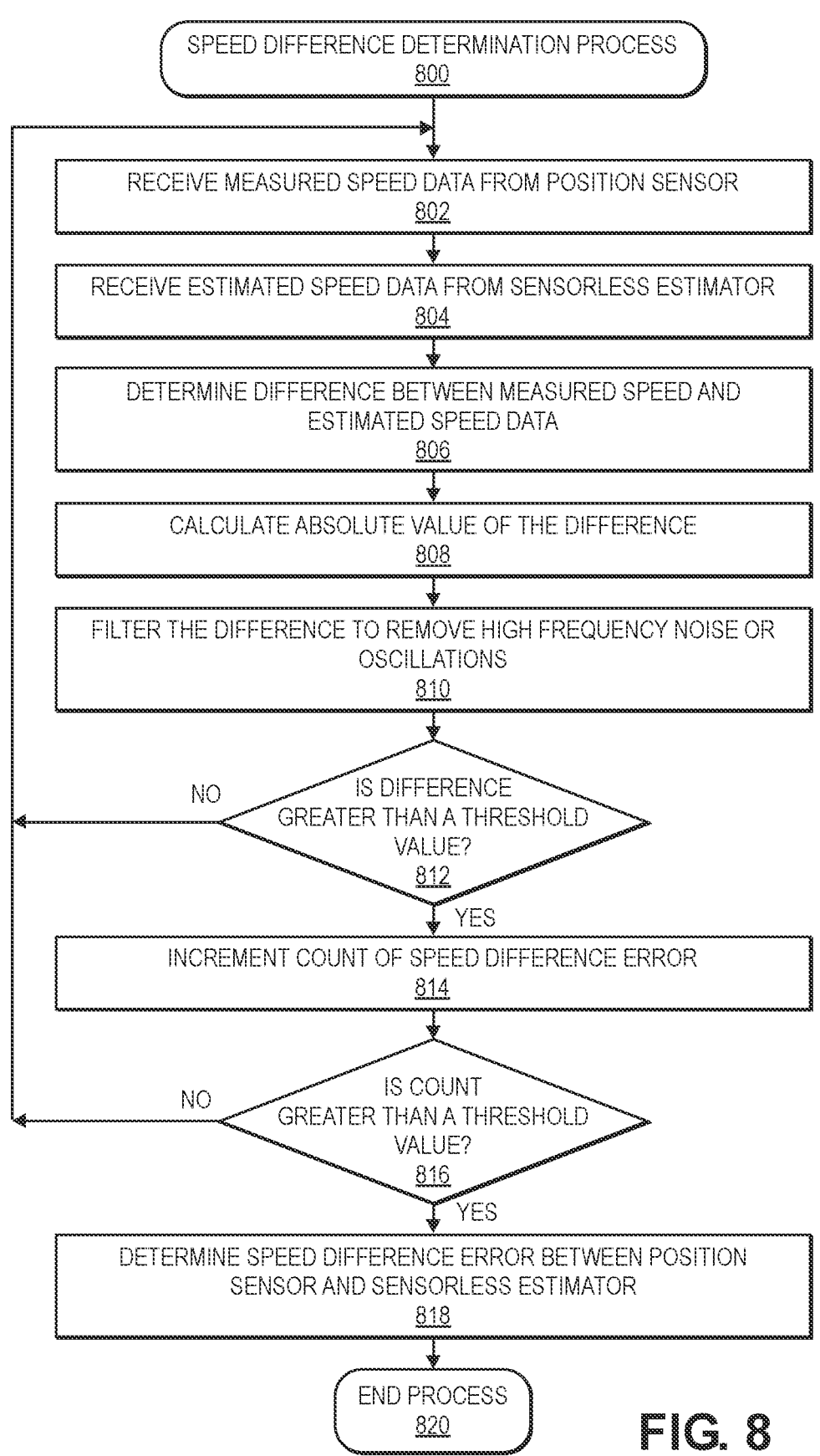
FIG. 8 is a flow diagram illustrating an example speed difference determination process, in accordance with implementations of the present disclosure.

FIG. 8 is a flow diagram illustrating an example speed difference determination process 800, in accordance with implementations of the present disclosure.

The process 800 may begin by receiving measured speed data from a position sensor, as at 802. For example, the position sensor data from at least one position sensor associated with a motor or electric drive may comprise measured position data and measured speed data. Further, a control system, controller, or processor may receive the measured speed data from the position sensor.

The process 800 may continue by receiving estimated speed data from a sensorless estimator, as at 804. For example, the estimated data from the sensorless estimator associated with a motor or electric drive may comprise estimated position data and estimated speed data. Further, a control system, controller, or processor may receive the estimated speed data from the sensorless estimator.

The process 800 may proceed by determining a difference between the measured speed data and the estimated speed data, as at 806. For example, the measured speed data from the at least one position sensor may be compared with the estimated speed data from the sensorless estimator to determine a difference between the speed data from the two different sources. Further, a control system, controller, or processor may determine a difference between the measured and estimated speed data.

The process 800 may continue to calculate an absolute value of the difference, as at 808. For example, the difference may comprise an alternating current signal, and the difference may be processed to take absolute values of the signal, such that only positive values of the difference remain. Further, a control system, controller, or processor may calculate an absolute value of the difference.

The process 800 may proceed to filter the difference to remove high frequency noise or oscillations, as at 810. For example, the positive values of the difference may be processed by a low pass filter that is configured to remove high frequency noise and/or signal oscillations. In additional examples, further processing may be performed on the difference, such as a saturation operation within upper and lower limit values and/or a hysteresis operation configured to remove or minimize sensitivity to small changes or perturbations. Further, a control system, controller, or processor may filter the difference and/or perform additional processing on the difference.

The process 800 may continue with determining if the difference is greater than a threshold value, as at 812. For example, in nominal operation of the at least one position sensor and the sensorless estimator, the difference between the measured and estimated speed data should be equal to zero within a threshold value. The threshold value may comprise various values or ranges, e.g., one or more values or ranges relatively close to zero, such as between approximately −0.2 and approximately 0.2, between approximately −0.3 and approximately 0.3, between approximately −0.5 and approximately 0.5, between approximately −0.6 and approximately 0.6, between approximately −1.0 and approximately 1.0, etc. Further, a control system, controller, or processor may determine if the difference between the measured and estimated speed data is greater than a threshold value.

If the difference between the measured and estimated speed data is not greater than a threshold value or outside a threshold range, the process 800 may return to step 802 to continue to receive and process measured speed data from at least one position sensor and estimated speed data from a sensorless estimator associated with a motor or electric drive.

If, however, the difference between the measured and estimated speed data is greater than a threshold value or outside a threshold range, the process 800 may proceed with incrementing a count of a speed difference error, as at 814. For example, the speed difference error may comprise or indicate a mismatch between the measured speed data of the at least one position sensor and the estimated speed data of the sensorless estimator. The count may comprise a total or aggregate number of determined differences that are greater than the threshold value or outside the threshold range. In some examples, the count may comprise a total number, time, or time duration of consecutive determined differences that are greater than the threshold value or outside the threshold range. In such examples, the count may be reset or zeroed out in response to a determination that the difference between the measured and estimated speed data is not greater than a threshold value or outside a threshold range at step 812. Moreover, in order to reset the count, the difference may be determined to be within a different threshold value or range, e.g., a smaller threshold value or range, in order to apply a hysteresis function and prevent erroneous resetting.

Further, a control system, controller, or processor may increment a count of the speed difference error.

The process 800 may then continue by determining whether the count is greater than a threshold value, as at 816. For example, the current value of the count may be compared with a threshold value associated with the count. The threshold value may comprise various values, e.g., approximately 5, approximately 10, etc. In addition, the threshold value may comprise a time or time duration, e.g., approximately 200 ms, approximately 300 ms, approximately 500 ms, approximately 1 s, or other time durations. Further, a control system, controller, or processor may determine if the count is greater than a threshold value.

If the count is not greater than the threshold value, the process 800 may return to step 802 to continue to receive and process measured speed data from at least one position sensor and estimated speed data from a sensorless estimator associated with a motor or electric drive.

If, however, the count is greater than the threshold value, the process 800 may proceed by determining a speed difference error between the position sensor and the sensorless estimator, as at 818. For example, the speed difference error instructions based on the detected faults or failure modes. In such examples, if a fault or failure mode is detected for any one of at least one position sensor or a sensorless estimator associated with a motor or electric drive of an aerial vehicle, a control system, controller, or processor of the aerial vehicle may stop, end, or terminate operation of the motor or electric drive that is experiencing the detected fault or failure mode.

In addition, remaining motors or electric drives that are not experiencing any faults or failure modes may continue operation, and may adjust their operation based on the stopping or termination of the faulted motor or electric drive. Further, flight or navigation operations of the aerial vehicle may be adjusted or modified, e.g., according to a motor out aerial vehicle control process, such as adjusting a flight path or other operational characteristics, continuing a current mission, aborting a current mission, returning to a home or other designated location, executing a safe landing at a designated location, and/or other modifications.

As shown in Table 1 herein, a substantially conservative approach to aerial vehicle control responsive to detected faults or failure modes is shown.

TABLE 1

| Speed difference error | Position sensor error | Sensorless estimator error | Fault or failure mode | Action |
|---|---|---|---|---|
| 1 | 0 | 1 | Estimator fault; position sensor good | Motor out |
| 1 | 1 | 0 | Position sensor fault; estimator good | Motor out |
| 1 | 1 | 1 | Both position sensor and estimator faults | Motor out |
| 1 | 0 | 0 | Unknown faults | Motor out |
| 0 | 0 | 1 | Estimator fault; position sensor good | Motor out |
| 0 | 1 | 0 | Position sensor fault; estimator good | Motor out |
| 0 | 1 | 1 | Both position sensor and estimator faults | Motor out |
| 0 | 0 | 0 | Nominal operation | Complete mission | may comprise or indicate a mismatch between the measured speed data from the at least one position sensor and the estimated speed data from the sensorless estimator. As a result, the determined speed difference error may indicate an error with one or both of the at least one position sensor and/or the sensorless estimator and associated motor or electric drive. Further, a control system, controller, or processor may determine the speed difference error between the at least one position sensor and the sensorless estimator.

The process 800 may then end, as at 820.

Using the fault detection systems and methods described herein related to various combinations of position sensor errors, sensorless estimator errors, and/or speed difference errors, aerial vehicles having multiple propulsion mechanisms, e.g., multiple motors or electric drives having respective or associated position sensors and/or sensorless estimators, may be controlled or operated to maintain safety, and also ensure reliable and efficient completion of assigned tasks, flights, or missions. For example, by combining detections or determinations of faults or failure modes associated with position sensor errors, sensorless estimator errors, and speed difference errors, substantially all possible faults or failure modes associated with position sensors, sensorless estimators, and associated motors or electric drives may be detected or determined. Based on the detected faults or failure modes, various different actions or instructions may be selected, commanded, or performed by aerial vehicles for safe navigation and completion of missions.

In some example embodiments, a substantially conservative approach may be selected or used for various actions or For each of the columns of Table 1 labeled "Speed difference error," "Position sensor error," and "Sensorless estimator error," a number zero in the column indicates that no fault or failure mode is detected with respect to that particular error determination method, and a number one in the column indicates that a fault or failure mode is detected with respect to that particular error determination method. In addition, the column of Table 1 labeled "Fault or failure mode" provides a short description of the detected faults corresponding to the data in the columns labeled "Speed difference error," "Position sensor error," and "Sensorless estimator error." Further, the column of Table 1 labeled "Action" indicates an example action or set of actions, instructions, or commands responsive to the detected faults or failure modes.

For example, as shown in the first row of Table 1, a speed difference error has been determined, and a sensorless estimator error has also been determined. As a result, the sensorless estimator may be experiencing a fault or failure mode, but the position sensor may be determined to be operating correctly or nominally. In the substantially conservative approach to aerial vehicle control, a motor out control process may be implemented or executed because the sensorless estimator has experienced a fault, despite the fact that the position sensor is still operating nominally. The motor out control process may comprise stopping or terminating operation of the motor or electric drive that is experiencing the fault, and remaining motors or electric drives may continue operation, flight, or navigation of the aerial vehicle as desired, e.g., aborting a mission, returning to a home location, landing at a safe designated location, or others.

In addition, the second through fourth rows of Table 1 also represent situations in which a speed difference error is determined, potentially in combination with detected errors of one, both, or none of the position sensor and/or the sensorless estimator. As set forth herein, in the substantially conservative approach to aerial vehicle control, a motor out control process may be implemented or executed because at least one fault has been determined with a motor or electric drive.

Further, the fifth through seventh rows of Table 1 also represent situations in which an error is determined with at least one of the position sensor and/or the sensorless estimator, even if no speed difference error is determined. Again, as set forth herein, in the substantially conservative In addition, remaining motors or electric drives that are not experiencing any faults or failure modes may continue operation, and may adjust their operation based on the stopping or termination of the faulted motor or electric drive. Further, flight or navigation operations of the aerial vehicle may be adjusted or modified, e.g., according to a motor out aerial vehicle control process, such as adjusting a flight path or other operational characteristics, continuing a current mission, aborting a current mission, returning to a home or other designated location, executing a safe landing at a designated location, and/or other modifications.

As shown in Table 2 herein, a more tolerant approach to aerial vehicle control responsive to detected faults or failure modes is shown.

TABLE 2

| Speed difference error | Position sensor error | Sensorless estimator error | Fault or failure mode | Action |
|---|---|---|---|---|
| 1 | 0 | 1 | Estimator fault; position sensor good | Complete mission |
| 1 | 1 | 0 | Position sensor fault; estimator good | Complete mission |
| 1 | 1 | 1 | Both position sensor and estimator faults | Motor out |
| 1 | 0 | 0 | Unknown fault | Motor out |
| 0 | 0 | 1 | Estimator fault; position sensor good | Complete mission |
| 0 | 1 | 0 | Position sensor fault; estimator good | Complete mission |
| 0 | 1 | 1 | Both position sensor and estimator faults | Motor out |
| 0 | 0 | 0 | Nominal operation | Complete mission | approach to aerial vehicle control, a motor out control process may be implemented or executed because at least one fault has been determined with a motor or electric drive.

The last, eighth row of Table 1 represents the situation in which no errors have been determined, such that all motors or electric drives of an aerial vehicle have correct or nominal operation. In the substantially conservative approach to aerial vehicle control, a normal or nominal operation of the aerial vehicle may be maintained, e.g., continuing to complete a current mission, in the absence of any faults or failure modes related to speed difference errors, position sensor errors, or sensorless estimator errors associated with respective motors or electric drives of the aerial vehicle.

In other example embodiments, a more tolerant approach may be selected or used for various actions or instructions based on the detected faults or failure modes. In such examples, if a fault or failure mode is detected based on any one of a speed difference error, a position sensor error, or a sensorless estimator error associated with a motor or electric drive of an aerial vehicle but at least one position sensor or the sensorless estimator is not experiencing a fault and is operating correctly or nominally, a control system, controller, or processor of the aerial vehicle may select position and speed data from the known, good position sensor or sensorless estimator for continued operation of the aerial vehicle, e.g., continuing to complete a current mission.

If, however, faults or failure modes are detected based on a speed difference error that indicates an unknown fault with either the position sensor or the sensorless estimator, or if faults or failure modes are detected based on both position sensor errors and sensorless estimator errors that indicate faults with both the position sensor and the sensorless estimator, a control system, controller, or processor of the aerial vehicle may stop, end, or terminate operation of the motor or electric drive that is experiencing the detected faults or failure modes.

The columns of Table 2 are labeled in analogous manner as the columns of Table 1 described herein, and indicate or include similar types of data or information as described herein with respect to Table 1.

For example, as shown in the first row of Table 2, a speed difference error has been determined, and a sensorless estimator error has also been determined. As a result, the sensorless estimator may be experiencing a fault or failure mode, but the position sensor may be determined to be operating correctly or nominally. In the more tolerant approach to aerial vehicle control, a control system, controller, or processor of the aerial vehicle may select position and speed data from the position sensor having nominal operation for further control of the respective motor or electric drive. Then, the aerial vehicle may continue operations to complete a current mission using all motors or electric drives of the aerial vehicle.

In addition, the second, fifth, and sixth rows of Table 2 also represent situations in which an error is determined with one of the position sensor or the sensorless estimator, but the other of the position sensor or the sensorless estimator is operating correctly or nominally. As set forth herein, in the more tolerant approach to aerial vehicle control, a control system, controller, or processor of the aerial vehicle may select position and speed data from the position sensor or the sensorless estimator having nominal operation for further control of the respective motor or electric drive. Then, the aerial vehicle may continue operations to complete a current mission using all motors or electric drives of the aerial vehicle.

Further, the third and seventh rows of Table 2 represent situations in which errors are determined with both of the position sensor and the sensorless estimator, and the fourth row of Table 2 represents a situation in which a speed difference error is determined such that an unknown fault or failure mode may be associated with one or both of the position sensor and the sensorless estimator. As a result, neither of the position sensor nor the sensorless estimator may be determined to be operating correctly or nominally. As set forth herein, in the more tolerant approach to aerial vehicle control, a motor out control process may be implemented or executed because neither of the position sensor nor the sensorless estimator may be determined to be operating correctly or nominally for further control of the respective motor or electric drive. The motor out control process may comprise stopping or terminating operation of the motor or electric drive that is experiencing the fault, and remaining motors or electric drives may continue operation, flight, or navigation of the aerial vehicle as desired, e.g., aborting a mission, returning to a home location, landing at a safe designated location, or others.

The last, eighth row of Table 2 represents the situation in which no errors have been determined, such that all motors or electric drives of an aerial vehicle have correct or nominal operation. In the more tolerant approach to aerial vehicle control, a normal or nominal operation of the aerial vehicle may be maintained, e.g., continuing to complete a current mission, in the absence of any faults or failure modes related to speed difference errors, position sensor errors, or sensorless estimator errors associated with respective motors or electric drives of the aerial vehicle.

In further example embodiments, two or dual position sensors may be associated with respective motors or electric drives of an aerial vehicle. Both of the dual position sensors may be configured to individually or independently detect or measure position and speed data, and also configured to individually or independently enable motor control using the position and speed data. As a result, position sensor errors may be individually or independently detected or determined for each of a first position sensor, e.g., position sensor 1 of Table 3, and a second position sensor, e.g., position sensor 2 of Table 3. Further, position and speed data from each of the first and second position sensors may be used individually or independently for motor control, as shown and described with respect to Table 3.

In such example embodiments, an expanded approach as shown in Table 3 may be selected or used for various actions or instructions based on the detected faults or failure modes. In such examples, if a fault or failure mode is detected based on any one of a speed difference error, a position sensor 1 error, a position sensor 2 error, or a sensorless estimator error associated with a motor or electric drive of an aerial vehicle but at least one position sensor or the sensorless estimator is not experiencing a fault and is operating correctly or nominally, a control system, controller, or processor of the aerial vehicle may select position and speed data from the known, good position sensor or sensorless estimator for continued operation of the aerial vehicle, e.g., continuing to complete a current mission.

If, however, faults or failure modes are detected based on a speed difference error that indicates an unknown fault with any one of the position sensors or the sensorless estimator, or if faults or failure modes are detected based on position sensor errors and sensorless estimator errors that indicate faults with all position sensors and the sensorless estimator, a control system, controller, or processor of the aerial vehicle may stop, end, or terminate operation of the motor or electric drive that is experiencing the detected faults or failure modes.

In addition, remaining motors or electric drives that are not experiencing any faults or failure modes may continue operation, and may adjust their operation based on the stopping or termination of the faulted motor or electric drive. Further, flight or navigation operations of the aerial vehicle may be adjusted or modified, e.g., according to a motor out aerial vehicle control process, such as adjusting a flight path or other operational characteristics, continuing a current mission, aborting a current mission, returning to a home or other designated location, executing a safe landing at a designated location, and/or other modifications.

As shown in Table 3 herein, an expanded approach to aerial vehicle control responsive to detected faults or failure modes is shown.

TABLE 3

| Speed difference error | Position sensor 1 error | Position sensor 2 error | Sensorless estimator error | Fault or failure mode | Action |
|---|---|---|---|---|---|
| 1 | 1 | 0 | 0 | Pos. sensor 1 fault; pos. sensor 2 and estimator good | Complete mission |
| 1 | 0 | 1 | 0 | Pos. sensor 2 fault; pos. sensor 1 and estimator good | Complete mission |
| 1 | 0 | 0 | 1 | Estimator fault; pos. sensor 1 and 2 good | Complete mission |
| 1 | 1 | 1 | 0 | Pos. sensor 1 and 2 faults; estimator good | Complete mission |
| 1 | 1 | 0 | 1 | Pos. sensor 1 and estimator faults; pos. sensor 2 good | Complete mission |
| 1 | 0 | 1 | 1 | Pos. sensor 2 and estimator faults; pos. sensor 1 good | Complete mission |
| 1 | 1 | 1 | 1 | All faults | MEP out |
| 1 | 0 | 0 | 0 | Unknown faults | MEP out |
| 0 | 1 | 0 | 0 | Pos. sensor 1 fault; pos. sensor 2 and estimator good | Complete mission |
| 0 | 0 | 1 | 0 | Pos. sensor 2 fault; pos. sensor 1 and estimator good | Complete mission |
| 0 | 0 | 0 | 1 | Estimator fault; pos. sensor 1 and 2 good | Complete mission |
| 0 | 1 | 1 | 0 | Pos. sensor 1 and 2 faults; estimator good | Complete mission |
| 0 | 1 | 0 | 1 | Pos. sensor 1 and estimator faults; pos. sensor 2 good | Complete mission |
| 0 | 0 | 1 | 1 | Pos. sensor 2 and estimator faults; pos. sensor 1 good | Complete mission |

TABLE 3-continued

| Speed difference error | Position sensor 1 error | Position sensor 2 error | Sensorless estimator error | Fault or failure mode | Action |
|---|---|---|---|---|---|
| 0 | 1 | 1 | 1 | All faults | MEP out |
| 0 | 0 | 0 | 0 | Nominal operation | Complete mission |

The columns of Table 3 are labeled in analogous manner as the columns of Tables 1 and 2 described herein, with the expansion of "Position sensor error" to include "Position sensor 1 error" and "Position sensor 2 error," and indicate or include similar types of data or information as described herein with respect to Tables 1 and 2.

For example, as shown in the first row of Table 3, a speed difference error has been determined, and a position sensor 1 error has also been determined. As a result, the first position sensor may be experiencing a fault or failure mode, but the second position sensor and the sensorless estimator may be determined to be operating correctly or nominally. In the expanded approach to aerial vehicle control, a control system, controller, or processor of the aerial vehicle may select position and speed data from either the second position sensor or the sensorless estimator having nominal operation for further control of the respective motor or electric drive. Then, the aerial vehicle may continue operations to complete a current mission using all motors or electric drives of the aerial vehicle.

In addition, the second through sixth rows and ninth through fourteenth rows of Table 3 also represent situations in which an error is determined with one or two of the first position sensor, the second position sensor, or the sensorless estimator, but at least one of the first position sensor, the second position sensor, or the sensorless estimator is operating correctly or nominally. As set forth herein, in the expanded approach to aerial vehicle control, a control system, controller, or processor of the aerial vehicle may select position and speed data from the at least one position sensor or sensorless estimator having nominal operation for further control of the respective motor or electric drive. Then, the aerial vehicle may continue operations to complete a current mission using all motors or electric drives of the aerial vehicle.

Further, the seventh and fifteenth rows of Table 3 represent situations in which errors are determined with both of the first and second position sensors and also the sensorless estimator, and the eighth row of Table 3 represents a situation in which a speed difference error is determined such that an unknown fault or failure mode may be associated with one or more of the first position sensor, the second position sensor, or the sensorless estimator. As a result, none of the first or second position sensors nor the sensorless estimator may be determined to be operating correctly or nominally. As set forth herein, in the expanded approach to aerial vehicle control, a motor out control process may be implemented or executed because none of the first or second position sensors nor the sensorless estimator may be determined to be operating correctly or nominally for further control of the respective motor or electric drive. The motor out control process may comprise stopping or terminating operation of the motor or electric drive that is experiencing the fault, and remaining motors or electric drives may continue operation, flight, or navigation of the aerial vehicle as desired, e.g., aborting a mission, returning to a home location, landing at a safe designated location, or others.

The last, sixteenth row of Table 3 represents the situation in which no errors have been determined, such that all motors or electric drives of an aerial vehicle have correct or nominal operation. In the expanded approach to aerial vehicle control, a normal or nominal operation of the aerial vehicle may be maintained, e.g., continuing to complete a current mission, in the absence of any faults or failure modes related to speed difference errors, position sensor errors, or sensorless estimator errors associated with respective motors or electric drives of the aerial vehicle.

Various other example embodiments of fault detection systems and methods may comprise other numbers or combinations of position sensors and/or sensorless estimators associated with respective motors or electric drives of an aerial vehicle. Various modifications to the aerial vehicle control processes or adaptations described herein may be made based on the different numbers or combinations of position sensors and/or sensorless estimators associated with respective motors or electric drives. In addition, various other modifications to the substantially conservative approach, the more tolerant approach, and/or the expanded approach may be made based on the required or desired level of safety during flight, navigation, or other operations of an aerial vehicle while completing various types of tasks, flights, or missions.

Figure 9:
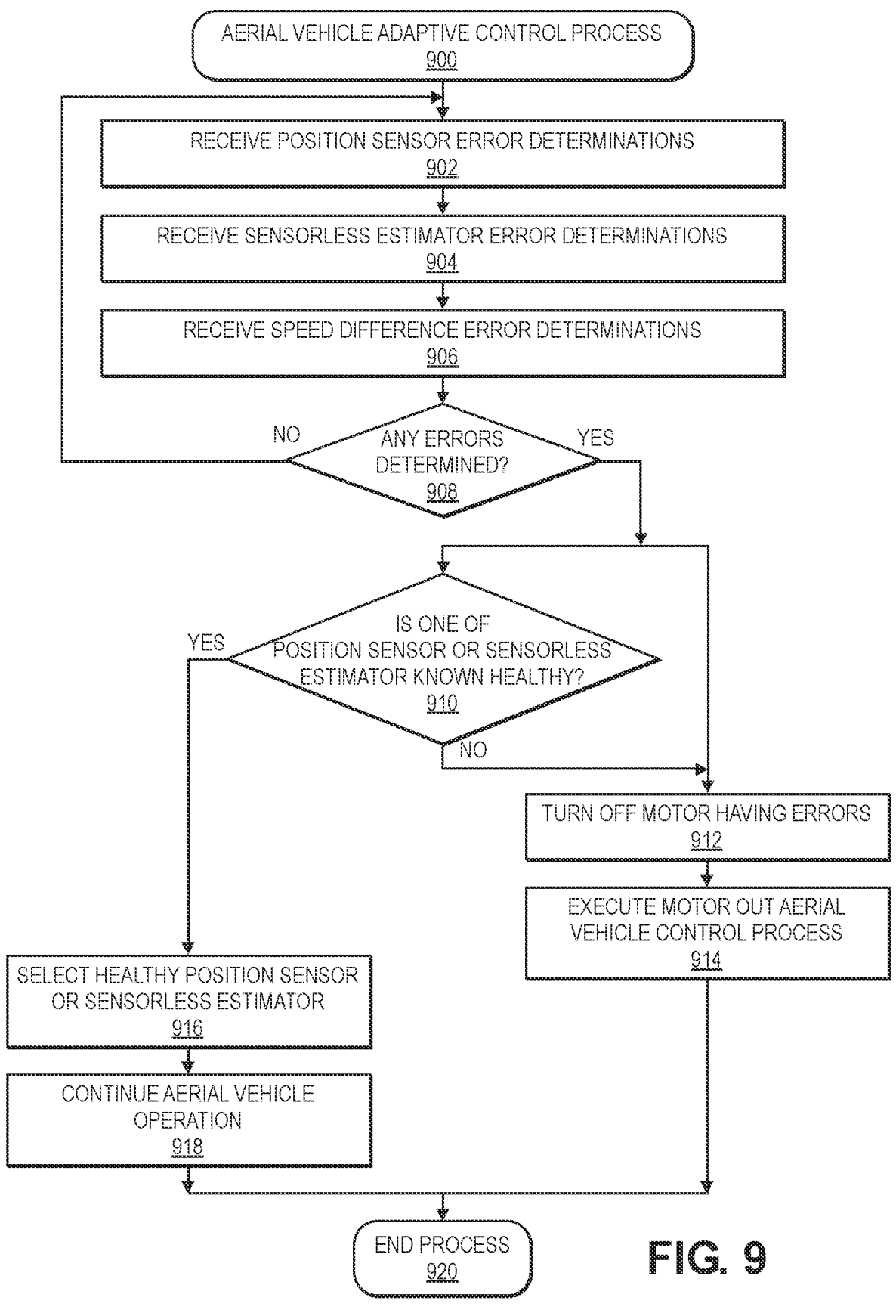
FIG. 9 is a flow diagram illustrating an example aerial vehicle adaptive control process, in accordance with implementations of the present disclosure.

FIG. 9 is a flow diagram illustrating an example aerial vehicle adaptive control process 900, in accordance with implementations of the present disclosure.

The process 900 may begin by receiving position sensor error determinations, as at 902. For example, the position sensor error determinations may comprise position sensor errors associated with dual resolver channels, as described at least in FIG. 3, and/or position sensor errors associated with individual channels, as described at least in FIG. 4. In example embodiments with multiple position sensors, position sensor error determinations may be received that are associated with respective ones of the multiple position sensors. Further, a control system, controller, or processor may receive the position sensor error determinations.

The process 900 may continue by receiving sensorless estimator error determinations, as at 904. For example, the sensorless estimator error determinations may comprise sensorless estimator errors, as described at least in FIG. 6. In example embodiments with multiple sensorless estimators, sensorless estimator error determinations may be received that are associated with respective ones of the multiple sensorless estimators. Further, a control system, controller, or processor may receive the sensorless estimator error determinations.

The process 900 may proceed by receiving speed difference error determinations, as at 906. For example, the speed difference error determinations may comprise difference data between measured speeds of position sensors and estimated speeds of sensorless estimators, as described at least in FIG. 8. Further, a control system, controller, or processor may receive the speed difference error determinations.

The process 900 may continue to determine if any errors have been determined, as at 908. For example, based on the received data related to position sensor error determinations, estimator error determinations, and/or speed difference error determinations, it may be determined whether any error determinations have been received. Further, a control system, controller, or processor may determine if any errors have been determined.

If no errors have been determined, the process 900 may return to step 902 to continue to receive error determinations related to position sensors, sensorless estimators, and/or speed differences. In addition, an aerial vehicle may continue operations using all motors or electric drives to complete a currently assigned task, mission, or operation.

In a substantially conservative approach to aerial vehicle control, if one or more errors have been determined at step 908, the process 900 may proceed to turn off the motor having errors, as at 912. For example, the motor or electric drive that is associated with the determined errors may be stopped or terminated. Further, a control system, controller, or processor may turn off or cause termination of the motor having the determined errors.

Continuing with the substantially conservative approach to aerial vehicle control, the process 900 may continue with executing a motor out aerial vehicle control process, as at 914. For example, after turning off the motor associated with the determined errors, remaining motors or electric drives of the aerial vehicle may continue or modify operations to maintain safe operation of the aerial vehicle. In addition, the motor out control process may comprise various actions or instructions, such as adjusting a flight path or other operational characteristics, continuing a current mission, aborting a current mission, returning to a home or other designated location, executing a safe landing at a designated location, and/or other modifications. Further, a control system, controller, or processor may execute a motor out aerial vehicle control process.

In a more tolerant and/or expanded approach to aerial vehicle control, if one or more errors have been determined at step 908, the process 900 may proceed with determining if one of a position sensor or a sensorless estimator is known to be healthy, as at 910. For example, it may be determined whether at least one of one or more position sensors or a sensorless estimator associated with a motor or electric drive is operating nominally or correctly. In some examples, it may be determined that at least one position sensor or a sensorless estimator may be operating nominally or correctly if no error determinations have been received that are related to the at least one position sensor or the sensorless estimator. Further, a control system, controller, or processor may determine if at least one of a position sensor or a sensorless estimator is healthy.

If it is determined at step 910 that no position sensor or sensorless estimator is known to be healthy, the process 900 may continue by turning off the motor having errors, as at 912. For example, the motor or electric drive that is associated with the determined errors may be stopped or terminated. Further, a control system, controller, or processor may turn off or cause termination of the motor having the determined errors.

Continuing with the more tolerant and/or expanded approach to aerial vehicle control, the process 900 may proceed by executing a motor out aerial vehicle control process, as at 914. For example, after turning off the motor associated with the determined errors, remaining motors or electric drives of the aerial vehicle may continue or modify operations to maintain safe operation of the aerial vehicle. In addition, the motor out control process may comprise various actions or instructions, such as adjusting a flight path or other operational characteristics, continuing a current mission, aborting a current mission, returning to a home or other designated location, executing a safe landing at a designated location, and/or other modifications. Further, a control system, controller, or processor may execute a motor out aerial vehicle control process.

If, however, it is determined at step 910 that at least one position sensor or a sensorless estimator is known to be healthy, the process 900 may continue to select a healthy position sensor or sensorless estimator, as at 916. For example, from among at least one position sensor or sensorless estimator associated with a motor or electric drive that is known to be healthy and/or not associated with any determined errors, one healthy position sensor or sensorless estimator may be selected for continued operation of the aerial vehicle. Further, a control system, controller, or processor may select a healthy or nominally operating position sensor or sensorless estimator for continued operation of the aerial vehicle.

Continuing with the more tolerant and/or expanded approach to aerial vehicle control, the process 900 may proceed to continue aerial vehicle operation, as at 918. For example, after selecting or switching to control of a motor or electric drive using position and speed data from a healthy or nominally operating position sensor or sensorless estimator, the aerial vehicle may continue operation using all motors or electric drives to complete a currently assigned task, operation, or mission. In the more tolerant and/or expanded approach, even if one or more position sensors and/or sensorless estimators associated with a motor or electric drive may be experiencing a fault or failure mode, if at least one position sensor or sensorless estimator is operating nominally or correctly, the aerial vehicle may continue operation using all motors or electric drives, including by selecting and using position and speed data from the nominally operating position sensor or sensorless estimator for the respective motor or electric drive. Further, a control system, controller, or processor may instruct continued aerial vehicle operation.

The process 900 may then end, as at 920.

Figure 10:
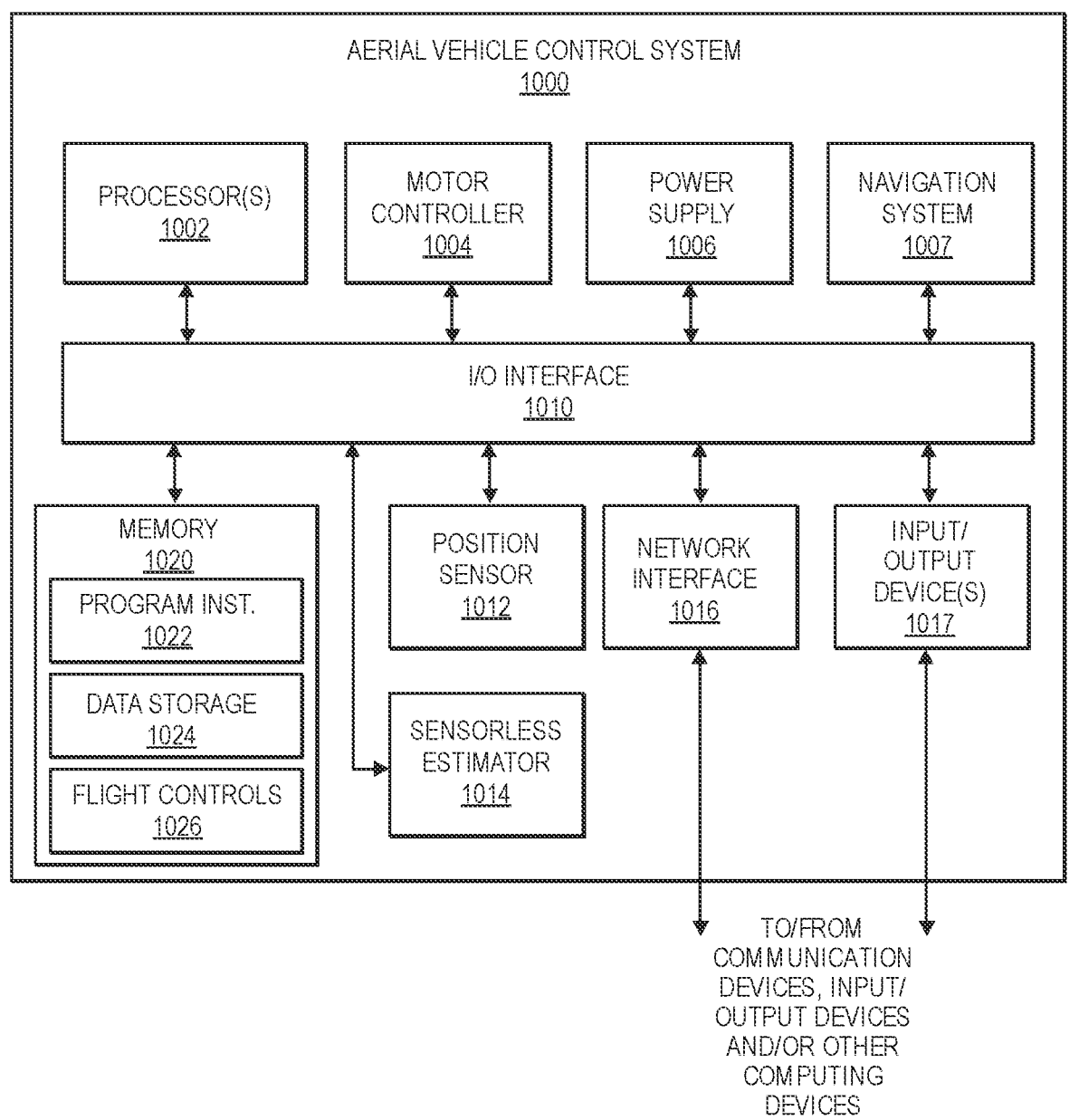
FIG. 10 is a block diagram illustrating various components of an example aerial vehicle control system, in accordance with implementations of the present disclosure.

FIG. 10 is a block diagram illustrating various components of an example aerial vehicle control system 1000, in accordance with implementations of the present disclosure.

In various examples, the block diagram may be illustrative of one or more aspects of the aerial vehicle control system 1000 that may be used to implement the various systems and processes discussed above. In the illustrated implementation, the aerial vehicle control system 1000 includes one or more processors 1002, coupled to a non-transitory computer readable storage medium 1020 via an input/output (I/O) interface 1010. The aerial vehicle control system 1000 may also include a motor controller 1004, a power supply or battery 1006, and/or a navigation system 1007. The aerial vehicle control system 1000 may further include at least one position sensor 1012, at least one sensorless estimator 1014, a network interface 1016, and one or more input/output devices 1017.

In various implementations, the aerial vehicle control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, any of the various data associated with error determination processes and aerial vehicle control processes described herein, and/or other data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024 and flight controls 1026, respectively. In other implementations, program instructions, data and/or flight controls data may be received, sent or stored upon different types of computer-accessible media, such as non-transitory media, or on similar media separate from the non-transitory computer readable storage medium 1020 or the aerial vehicle control system 1000.

Generally, a non-transitory, computer readable storage medium may include storage media or memory media such as magnetic or optical media, e.g., disk or CD/DVD-ROM, coupled to the aerial vehicle control system 1000 via the I/O interface 1010. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1016 or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The motor controller 1004 may communicate with the processors 1002, the navigation system 1007, and/or other components of the aerial vehicle control system 1000 and adjust the operational characteristics of each propulsion mechanism, e.g., motors or electric drives, to guide the aerial vehicle along a determined path and/or to perform other navigational maneuvers. The navigation system 1007 may include a GPS or other similar system than can be used to navigate the aerial vehicle to and/or from a location.

The aerial vehicle control system 1000 may also include at least one position sensor 1012 that receives, detects, or measures position and speed data of respective motors or electric drives. As described herein, the at least one position sensor 1012 may comprise an encoder, resolver, or other similar component having one or more channels. The at least one position sensor 1012 may be in communication with the processor(s) 1002, the motor controller 1004, the non-transitory computer readable storage medium 1020, and/or other components of the aerial vehicle control system 1000. In some examples, one position sensor 1012 may be associated with each respective motor or electric drive of an aerial vehicle. In other examples, two or more position sensors 1012, or two or more channels of a position sensor, may be associated with each respective motor or electric drive of an aerial vehicle. As described herein, the measured position and speed data from the at least one position sensor 1012 may be processed to determine various errors related to position sensors and associated motors or electric drives, as well as to enable control of the motors or electric drives for safe flight, navigation, or other operations.

The aerial vehicle control system 1000 may also include at least one sensorless estimator 1014 that determines or estimates position and speed data of respective motors or electric drives. As described herein, the at least one sensorless estimator 1014 may comprise a sensorless motor control algorithm, process, or technique that estimates position and speed data based on various received signals, e.g., current signals or others. The at least one sensorless estimator 1014 may be in communication with the processor(s) 1002, the motor controller 1004, the non-transitory computer readable storage medium 1020, and/or other components of the aerial vehicle control system 1000. In some examples, one sensorless estimator 1014 may be associated with each respective motor or electric drive of an aerial vehicle. In other examples, two or more sensorless estimators 1014 may be associated with each respective motor or electric drive of an aerial vehicle. As described herein, the estimated position and speed data from the at least one sensorless estimator 1014 may be processed to determine various errors related to sensorless estimators and associated motors or electric drives, as well as to enable control of the motors or electric drives for safe flight, navigation, or other operations.

The network interface 1016 may be configured to allow data to be exchanged between the aerial vehicle control system 1000, other devices attached to a network, such as other computer systems, sensors, management systems, and/or control systems of other vehicles, machines, equipment, apparatuses, systems, or devices. For example, the network interface 1016 may enable wireless communication between numerous aerial vehicles. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1017 may, in some implementations, include one or more displays, imaging sensors, image capture devices, thermal sensors, infrared sensors, or other visual input/output devices, microphones, speakers, or other audio input/output devices, various time of flight sensors, accelerometers, pressure sensors, weather sensors, various other sensors described herein, etc. Multiple input/output devices 1017 may be present and controlled by the aerial vehicle control system 1000. One or more of these sensors may be utilized to assist in performing the various functions, operations, and processes described herein.

As shown in FIG. 10, the memory may include program instructions 1022 which may be configured to implement the example processes and/or sub-processes described above. The data storage 1024 may include various data stores for maintaining data items that may be provided for performing the various functions, operations, and processes described herein. For example, the data storage 1024 may include any and all of the various data associated with error determination processes and aerial vehicle control processes described herein, and/or other data items.

Those skilled in the art will appreciate that the aerial vehicle control system 1000 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground based vehicles and water based vehicles.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 4, 6, 8, and 9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a body;
   a plurality of motors associated with the body; and
   a control system comprising a processor and a memory, the control system configured to at least:
      receive a position sensor error determination associated with a first motor of the plurality of motors;
      receive a sensorless error determination associated with the first motor;

receive a speed difference error determination associated with the first motor; and responsive to at least one of the position sensor error determination, the sensorless error determination, or the speed difference error determination indicating a fault associated with the first motor, modify an operation of the first motor.

2. The aerial vehicle of claim 1, wherein the position sensor error determination indicates a fault associated with at least one position sensor that is associated with the first motor;

wherein the sensorless error determination indicates a fault associated with at least one sensorless estimator that is associated with the first motor; and wherein the speed difference error determination indicates a fault associated with at least one of the at least one position sensor or the at least one sensorless estimator that is associated with the first motor.

3. The aerial vehicle of claim 1, wherein modifying the operation of the first motor comprises stopping operation of the first motor; and wherein the control system is further configured to:

responsive to stopping operation of the first motor, execute a motor out aerial vehicle control process.

4. The aerial vehicle of claim 1, wherein modifying the operation of the first motor comprises selecting a healthy position sensor or sensorless estimator associated with the first motor; and wherein the control system is further configured to:

responsive to selecting the healthy position sensor or sensorless estimator, continue operation of the first motor using data from the healthy position sensor or sensorless estimator.

5. The aerial vehicle of claim 1, wherein the control system is further configured to:

responsive to none of the position sensor error determination, the sensorless error determination, or the speed difference error determination indicating a fault associated with the first motor, continue operation of the first motor.

6. A method for an aerial vehicle, comprising:

instructing a position sensor error determination associated with a position sensor of a first motor of a plurality of motors of an aerial vehicle;

instructing a sensorless error determination associated with a sensorless estimator of the first motor;

responsive to at least one of the position sensor error determination or the sensorless error determination indicating a fault associated with the first motor, modifying an operation of the first motor.

7. The method of claim 6, wherein the position sensor error determination indicates a fault associated with position and speed data measured by a single position sensor that is associated with the first motor.

8. The method of claim 7, wherein the fault is determined based at least in part on a sum of squares of a sine signal and a cosine signal measured by the single position sensor.

9. The method of claim 6, wherein the position sensor error determination indicates a fault associated with position and speed data measured by two position sensors that are associated with the first motor.

10. The method of claim 9, wherein the fault is determined based at least in part on:

a difference between a sine signal measured by a first position sensor of the two position sensors and a sine signal measured by a second position sensor of the two position sensors, or a difference between a cosine signal measured by the first position sensor of the two position sensors and a cosine signal measured by the second position sensor of the two position sensors.

11. The method of claim 6, wherein the sensorless estimator error determination indicates a fault associated with position and speed data estimated by the sensorless estimator that is associated with the first motor.

12. The method of claim 11, wherein the fault is determined based at least in part on an angle error value calculated by the sensorless estimator.

13. The method of claim 6, further comprising:

instructing a speed difference error determination associated with at least one of the position sensor or the sensorless estimator of the first motor; and responsive to at least one of the position sensor error determination, the sensorless error determination, or the speed difference error determination indicating a fault associated with the first motor, modifying the operation of the first motor.

14. The method of claim 13, wherein the speed difference error determination indicates a fault associated with at least one of speed data measured by the position sensor or speed data estimated by the sensorless estimator.

15. The method of claim 14, wherein the fault is determined based at least in part on a difference between the speed data measured by the position sensor and the speed data estimated by the sensorless estimator.

16. The method of claim 6, wherein the fault is determined based at least in part on a count of detected errors reaching or exceeding a threshold value, time, or time duration.

17. A method, comprising:

receiving a position sensor error determination associated with a first motor of the plurality of motors of an aerial vehicle;

receiving a sensorless error determination associated with the first motor;

receiving a speed difference error determination associated with the first motor; and responsive to at least one of the position sensor error determination, the sensorless error determination, or the speed difference error determination indicating a fault associated with the first motor, modifying an operation of the first motor.

18. The method of claim 17, wherein modifying the operation of the first motor further comprises:

stopping operation of the first motor; and responsive to stopping operation of the first motor, executing a motor out aerial vehicle control process.

19. The method of claim 17, wherein a plurality of position sensors are associated with the first motor; and wherein modifying the operation of the first motor further comprises:

selecting a healthy position sensor from the plurality of position sensors associated with the first motor; and responsive to selecting the healthy position sensor, continuing operation of the first motor using data from the healthy position sensor.

20. The method of claim 17, wherein a plurality of sensorless estimators are associated with the first motor; and wherein modifying the operation of the first motor further comprises:

selecting a healthy sensorless estimator from the plurality of sensorless estimators associated with the first motor; and responsive to selecting the healthy sensorless estimator, continuing operation of the first motor using data from the healthy sensorless estimator.

\* \* \* \* \*